(12) United States Patent
Venkatesan et al.

(10) Patent No.: US 12,445,415 B2
(45) Date of Patent: Oct. 14, 2025

(54) VERIFIABLE IDENTITY MAP MAINTAINING IDENTITIES AND ASSOCIATED PUBLIC KEYS

(71) Applicant: Microsoft Technology Licensing, LLC, Redmond, WA (US)

(72) Inventors: Ramarathnam Venkatesan, Redmond, WA (US); Nishanth Chandran, Bangalore (IN); Srinath Setty, Redmond, WA (US); Panagiotis Antonopoulos, Redmond, WA (US); Satyanarayana Venkata Lokam, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 62 days.

(21) Appl. No.: 17/819,030

(22) Filed: Aug. 11, 2022

(65) Prior Publication Data
US 2024/0056424 A1 Feb. 15, 2024

(51) Int. Cl.
*H04L 9/40* (2022.01)
*H04L 9/00* (2022.01)
*H04L 9/08* (2006.01)

(52) U.S. Cl.
CPC ........ *H04L 63/0428* (2013.01); *H04L 9/0822* (2013.01); *H04L 9/50* (2022.05)

(58) Field of Classification Search
CPC ...... H04L 63/0428; H04L 9/50; H04L 9/0822
See application file for complete search history.

(56) References Cited

U.S. PATENT DOCUMENTS

| 8,601,549 B2 | 12/2013 | Dickerson |
| 9,547,771 B2 | 1/2017 | Roth |

(Continued)

FOREIGN PATENT DOCUMENTS

| CN | 110363528 A | 10/2019 |
| CN | 114221764 A | 3/2022 |
| JP | 2022020557 A | 2/2022 |

OTHER PUBLICATIONS

International Search Report and Written Opinion received for PCT Application No. PCT/US23/030988, mailed on Nov. 30, 2023, 13 pages.

(Continued)

*Primary Examiner* — Viet D Vu
(74) *Attorney, Agent, or Firm* — Weaver IP L.L.C.

(57) ABSTRACT

Embodiments described herein are directed to a verifiable identity map that maintains identities and public keys associated with the identities. The map is maintained by a ledger database that provides tamper-resistant/evident capabilities for tables (comprising the map) thereof. For instance, when a materialized view of the database is generated, the database provides a digest representative of a state thereof to computing devices that access the map for the keys. When the database receives a request from a device to access the map, the digest is received along therewith. The database is validated based on the digest to determine whether the database has been tampered with since the provision of the digest. Responsive to a successful validation, the database provides access in accordance with the request. When a key in the map is updated, the database subsequently generates a new digest, which is provided to the computing device.

20 Claims, 12 Drawing Sheets

(56) References Cited

U.S. PATENT DOCUMENTS

| | | |
|---|---|---|
| 10,211,977 B1 | 2/2019 | Roth |
| 10,637,855 B2 | 4/2020 | Mikulski |
| 10,990,689 B1 | 4/2021 | Reiner |
| 11,036,869 B2 | 6/2021 | Roth |
| 11,139,954 B2 | 10/2021 | Mercuri |
| 11,424,920 B2 | 8/2022 | Bursell |
| 11,544,409 B2 | 1/2023 | Brannon |
| 11,593,316 B2 | 2/2023 | Haldar |
| 11,695,555 B2 | 7/2023 | Roth |
| 11,799,630 B2 | 10/2023 | Zhang |
| 11,886,574 B2 | 1/2024 | Bursell |
| 12,058,265 B2 | 8/2024 | Khoury |
| 12,107,900 B2 | 10/2024 | Gargaro |
| 2002/0023213 A1 | 2/2002 | Walker |
| 2002/0138738 A1 | 9/2002 | Sames |
| 2007/0055867 A1* | 3/2007 | Kanungo ............ H04L 9/3265 713/156 |
| 2012/0060207 A1 | 3/2012 | Mardikar et al. |
| 2013/0145151 A1* | 6/2013 | Brown ............... H04L 9/3265 713/156 |
| 2015/0089575 A1 | 3/2015 | Vepa |
| 2015/0288669 A1 | 10/2015 | Litoiu |
| 2015/0381575 A1 | 12/2015 | Bhargav-spantzel et al. |
| 2017/0041148 A1 | 2/2017 | Pearce |
| 2017/0111175 A1 | 4/2017 | Oberhauser et al. |
| 2019/0020485 A1* | 1/2019 | Uhr ........................ G06Q 50/18 |
| 2019/0163912 A1* | 5/2019 | Kumar .................. H04L 9/0877 |
| 2019/0258811 A1 | 8/2019 | Ferraiolo |
| 2019/0370358 A1 | 12/2019 | Nation |
| 2019/0394175 A1 | 12/2019 | Zhang |
| 2020/0014537 A1 | 1/2020 | Ortiz |
| 2020/0082401 A1 | 3/2020 | Arora |
| 2020/0322342 A1 | 10/2020 | Gokhale |
| 2020/0374105 A1 | 11/2020 | Padmanabhan |
| 2020/0396222 A1 | 12/2020 | Gargaro et al. |
| 2020/0404023 A1 | 12/2020 | Zhu |
| 2021/0089676 A1 | 3/2021 | Ford |
| 2021/0092607 A1 | 3/2021 | Klinkner |
| 2021/0218742 A1 | 7/2021 | Cook |
| 2021/0232707 A1 | 7/2021 | Wilson |
| 2021/0233673 A1 | 7/2021 | Zhang |
| 2021/0273931 A1 | 9/2021 | Murdoch et al. |
| 2021/0279355 A1 | 9/2021 | Otte |
| 2021/0303714 A1 | 9/2021 | Yaghoobi |
| 2021/0367778 A1 | 11/2021 | Hamel |
| 2021/0377037 A1 | 12/2021 | Antonopoulos et al. |
| 2022/0020003 A1 | 1/2022 | Sarkar |
| 2022/0021711 A1 | 1/2022 | Marsh |
| 2022/0138181 A1 | 5/2022 | Irazabal |
| 2022/0188810 A1 | 6/2022 | Doney |
| 2022/0269927 A1 | 8/2022 | Rice |
| 2022/0271936 A1 | 8/2022 | Doney |
| 2022/0292211 A1 | 9/2022 | Reineke |
| 2022/0400020 A1 | 12/2022 | Davies |
| 2022/0417254 A1 | 12/2022 | Michaelis |
| 2023/0015569 A1 | 1/2023 | Davies |
| 2023/0035317 A1 | 2/2023 | Jufer |
| 2023/0336547 A1 | 10/2023 | Damour |
| 2023/0379699 A1 | 11/2023 | Oerton |
| 2023/0388348 A1 | 11/2023 | Authement |
| 2024/0089098 A1 | 3/2024 | Venkatesan |
| 2024/0104229 A1 | 3/2024 | Venkatesan |
| 2024/0119168 A1 | 4/2024 | Venkatesan |
| 2024/0121081 A1 | 4/2024 | Venkatesan |

OTHER PUBLICATIONS

Antonopoulos, et al., "SQL Ledger: Cryptographically Verifiable Data in Azure SQL Database", In Proceedings of the International Conference on Management of Data, Jun. 20, 2021, pp. 2437-2449.

"International Search Report and Written Opinion Issued in PCT Application No. PCT/US23/027303", Mailed Date: Oct. 13, 2023, 12 Pages.

Yue, et al., "GlassDB: An Efficient Verifiable Ledger Database System Through Transparency", In repository of arXiv:2207.00944v2, Aug. 8, 2022, 14 Pages.

Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.

International Search Report and Written Opinion received for PCT Application No. PCT/US2023/031022, mailed on Dec. 11, 2023, 16 pages.

Mounnan, et al., "Efficient Distributed Access Control Using Blockchain for Big Data in Clouds", International Conference on Wireless and Mobile Communications (ICWMC), Jun. 30, 2019, pp. 53-62.

Non-Final Office Action mailed on Sep. 6, 2024, in U.S. Appl. No. 17/937,098, 18 pages.

Non-Final Office Action mailed on Oct. 18, 2024, in U.S. Appl. No. 17/934,730, 25 pages.

Notice of Allowance mailed on Mar. 14, 2025, in U.S. Appl. No. 17/937,098, 12 pages.

Application as Filed in U.S. Appl. No. 17/819,030, filed on Aug. 11, 2022, 57 Pages.

Final Office Action mailed on Apr. 24, 2025, in U.S. Appl. No. 17/934,730, 27 pages.

International Preliminary Report on Patentability received for PCT Application No. PCT/US23/030988, Apr. 3, 2025, 08 pages.

International Preliminary Report on Patentability received for PCT Application No. PCT/U823/031022, mailed on Apr. 10, 2025, 09 pages.

Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.

Singh, et al., "Security for Online Transaction Based on User Location", In Journal of International Journal For Innovative Research In Multidisciplinary Field, vol. 3, Issue 4, Apr. 1, 2017, pp. 60-64.

Notice of Allowance mailed on May 19, 2025, in U.S. Appl. No. 17/937,098 12 pages.

Notice of Allowance mailed on May 20, 2025, in U.S. Appl. No. 17/938,711, 10 pages.

* cited by examiner

900

VERIFIABLE IDENTITY MAP MAINTAINING IDENTITIES AND ASSOCIATED PUBLIC KEYS

BACKGROUND

Public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

One potential security vulnerability in using asymmetric keys is the possibility of a "man-in-the-middle" attack, in which the attacker secretly relays and possibly alters the communications between two parties who believe that they are directly communicating with each other, as the attacker has inserted themselves between the two parties. For instance, suppose Alice asks Bob for his public key. If Bob sends his public key to Alice, but Charles is able to intercept it, a "man-in-the-middle" attack can begin, where Charles sends Alice a forged message that appears to originate from Bob, but instead includes Mallory's public key. Alice, believing this public key to be Bob's, encrypts her message with Charles' public key and sends the encrypted message back to Bob. Charles intercepts the message, decrypts the message using his private key, and may utilize the message for nefarious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The embodiments described herein are directed to a verifiable identity map that maintains identities and public keys associated with the identities. The public keys include a long-term public signing key and/or a short-term public encryption key. The verifiable identity map is maintained by a ledger database that provides tamper-resistant/evident capabilities for tables (comprising the identity map) thereof, where one can cryptographically attest that the identity map maintained by the ledger database has not been tampered with. For instance, when a materialized view of the ledger database is generated, the ledger database provides a digest representative of a state thereof to computing devices that access the identity map, for example, to update or lookup public keys. When the ledger database receives a request from a particular computing device to update or lookup a key in the identity map, the digest is received along therewith. The ledger database then determines a root hash value representative of the contents thereof and validates the root hash value against the digest to determine whether the ledger database has been tampered with since the provision of the digest. Responsive to a successful validation, the ledger database completes the update or lookup in accordance with the request. In the event that a public key was updated, the ledger database subsequently generates a new digest and provides the computing device access to the new digest.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
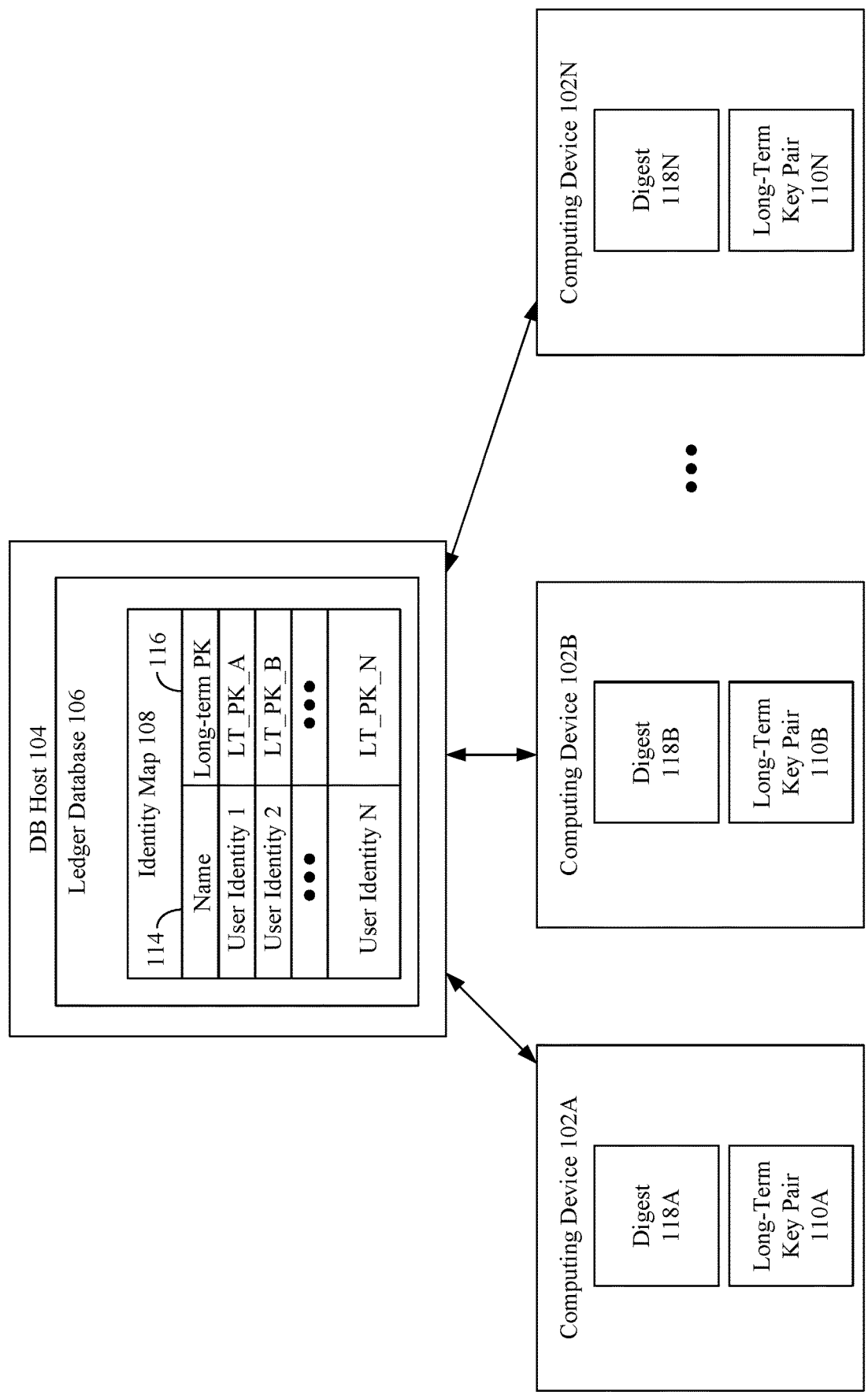
FIG. 1 shows a block diagram of an example system for providing a verifiable identity map in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The embodiments described herein are directed to a verifiable identity map that maintains identities and public keys associated with the identities. The public keys include a long-term public signing key and/or a short-term public encryption key. The verifiable identity map is maintained by a ledger database that provides tamper-resistant/evident capabilities for tables (comprising the identity map) thereof, where one can cryptographically attest that the identity map maintained by the ledger database has not been tampered with. For instance, when a materialized view of the ledger database is generated, the ledger database provides a digest representative of a state thereof to computing devices that access the identity map, for example, to update or lookup public keys. When the ledger database receives a request from a particular computing device to update or lookup a key in the identity map, the digest is received along therewith. The ledger database then determines a root hash value representative of the contents thereof and validates the root hash value against the digest to determine whether the ledger database has been tampered with since the provision of the digest. Responsive to a successful validation, the ledger database completes the update or lookup in accordance with the request. In the event that a public key was updated, the ledger database subsequently generates a new digest and provides the computing device access to the new digest.

The techniques described herein advantageously provide improvements in other technologies, namely data encryption, security, and privacy. For instance, as described herein, the embodiments described herein prevent "man-in-the-middle" attacks because data integrity, consistency and freshness are guaranteed. For instance, each public key is associated with an identity in the verifiable identity map in a manner that enables verification of the key, and each public key is only updateable by the identity that owns the key. That is, another party cannot assume the identity of another identity and insert their own key, and each user of the identity map is not provided with a different view of the identity map, nor does the ledger database provide a stale key.

In addition, by preventing "man-in-the-middle" attacks, access to personal and/or confidential information (e.g., login credentials) is prevented. By doing so, the techniques described herein also prevent access to a user's network and computing entities (e.g., computing devices, virtual machines, etc.). By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity (i.e., the "man-in-the-middle") from utilizing such compute resources, e.g., for nefarious purposes.

FIG. 1 shows a block diagram of an example system 100 for providing a verifiable identity map, according to an example embodiment. As shown in FIG. 1, system 100 includes a plurality of computing devices 102A-102N and a database (DB) host 104. Each of computing devices 102A-102N is any type of processing device, including, but not limited to, a desktop computer, a server, a mobile or handheld device (e.g., a tablet, a personal data assistant (PDA), a smart phone, a laptop, etc.), an Internet-of-Things (IoT) device, etc. DB host 104 comprises one or more server computers or computing devices, which include one or more distributed or "cloud-based" servers, in embodiments. In embodiments, DB host 104 is associated with, or is a part of, a cloud-based service platform and in some embodiments, DB host 104 comprises an on-premises server(s) in addition to, or in lieu of, cloud-based servers. DB host 104 is configured to host and execute any type of DB server application, such as but not limited to, Azure SQL Database™ from Microsoft Corporation of Redmond, WA. In embodiments, computing devices 102A-102N and database host 104 are communicatively coupled via one or more networks, comprising one or more of local area networks (LANs), wide area networks (WANs), enterprise networks, the Internet, etc., and includes one or more of wired and/or wireless portions.

As shown in FIG. 1, DB host 104 executes a ledger database 106. Ledger database 106 provides tamper-evidence capabilities for database tables of ledger database 106 (referred to as ledger tables), where one can cryptographically attest to other parties, such as auditors or other parties that the data maintained by the database has not been tampered with. Ledger database 106 protects data from any attacker or high-privileged user, including database administrators, system administrators, and cloud administrators. As with a traditional ledger, historical data is preserved. If a row is updated in a ledger table, its previous value is maintained and protected in a history table. Ledger database 106 provides a chronicle of all changes made to the database over time. In accordance with an embodiment, historical data is maintained in a relational form to support queries (e.g., SQL queries) for auditing, forensics, and other purposes.

Any rows modified by a transaction in a ledger table is cryptographically hashed (e.g., SHA-256 hashed) using a data structure, such as a Merkle tree, that creates a root hash representing all rows in the transaction. The transactions that ledger database 106 processes are then also hashed together through a Merkle tree data structure. The result is a root hash that forms a block. The block is then hashed through the root hash of the block, along with the root hash of the previous block as input to the hash function. That hashing forms a blockchain. The root hashes, also referred herein as database digests, contain the cryptographically hashed transactions and represent the state of the database at the time the digests were generated. In accordance with an embodiment, the digests are periodically generated and stored outside the database in tamper-proof storage. Digests are later used to verify the integrity of the database by comparing the value of the hash in the digest against the calculated hashes in database.

Materialized views of ledger tables are generated in fixed periodic intervals referred to as epochs. Ledger database 106 is also configured to provide forward integrity, which guarantees that given a materialized view of a ledger table at any time t, it is infeasible to tamper the ledger table in any subsequent epoch.

Ledger database 106 is configured to store and protect any type of data or information, including, but not limited to a verifiable identity map 108. Verifiable identity map 108 is configured to store an identity for each of a plurality of users (e.g., members, employees, etc.), for example, of an organization. Each identity comprises information that uniquely identifies the user within the organization. Examples of the identity include, but are not limited to, the user's email address, the user's phone number, the user's username, or any other type of information that uniquely identifies the user. Identity map 108 is also configured to store, for each user, a long-term public signing key of the user in association with the identity of the user. In accordance with an embodiment, identity map 108 is also configured to store, for each user, a short-term public encryption key of the user, which is further described below.

Each organization maintains and/or publishes their own identity map comprising identities and public key(s) for members of the organization. As such, each organization acts as their own identity or certification authorities. Using the identity maps, a member of one organization can establish a secure channel with a member of another organization, as further described below.

To initially generate identity map 108, the organization obtains the identities of its members and stores the identities in a column 114 of identity map 108 configured to store identities. The organization also obtains the long-term public signing keys of its members and stores the long-term private signing keys in a column 116 of identity map 108 configured to store long-term private signing keys. The organization then signs identity map 108 using its own private signing key. This initial identity map 108 is considered to be trusted and verifiable, as the binding between respective identities and long-term public signing keys is signed by the private signing key of the organization and is verifiable using the public signing key corresponding to the private signing key of the organization.

In accordance with an embodiment, the long-term public signing keys collected for the members are stored on and/or obtained from the computing devices 102A-102N thereof. For instance, as shown in FIG. 1, each of computing devices 102A-102N stores a respective a long-term signing key pair 110A-110N, which includes a long-term private signing key and a long-term public signing key. The long-term signing key pairs 110A-110N are generated by a trusted or customer-controlled service. Each of long-term signing key pairs 110A-110N comprises randomly-generated numbers (e.g., the service comprises a random number generator that generates long-term signing key pairs 110A-110N). In accordance with an embodiment, the service executes locally on each of computing devices 102A-102N. In accordance with another embodiment, the service executes remotely from computing devices 102A-102N. In accordance with such an embodiment, long-term signing key pairs 110A-110N are generated from a key generating web service, where computing devices 102A-102N submit a request to the service for a long-term key pair. Responsive to receiving the request, the service generates (e.g., randomly) the long-term key pair and provides the generated key pair to the requesting computing device via a response. In accordance with an embodiment, the service is a Proof of Possession (PoP)-based service; although it is noted that the embodiments described herein are not so limited.

The long-term private signing key of pairs 110A-110N are respectively stored locally in a secure environment of a computing device of computing devices 102A-102N. Examples of a secure environment include, but are not limited to, a trusted platform module (TPM), a hardware security module (HSM), or any type of secure hardware and/or software-based cryptoprocessor.

Ledger database 106 is configured to provide users of computing devices 102A-102N access to a digest, which is representative of the state of ledger database 106 (including identity map 108). For example, as shown in FIG. 1, computing device 102A stores digest 118A, computing device 102B stores digest 118B, and computing device 102N stores digest 118N. Each of digests 118A-118N are copies of the same digest made accessible by DB host 104. Additional details regarding ledger database 106 are provided below with reference to FIG. 2. It is noted that in embodiments, ledger database 106 is configured to provide users of computing devices 102A-102N access to some or all of the digests that are generated by ledger database 106 over time.

Figure 2:
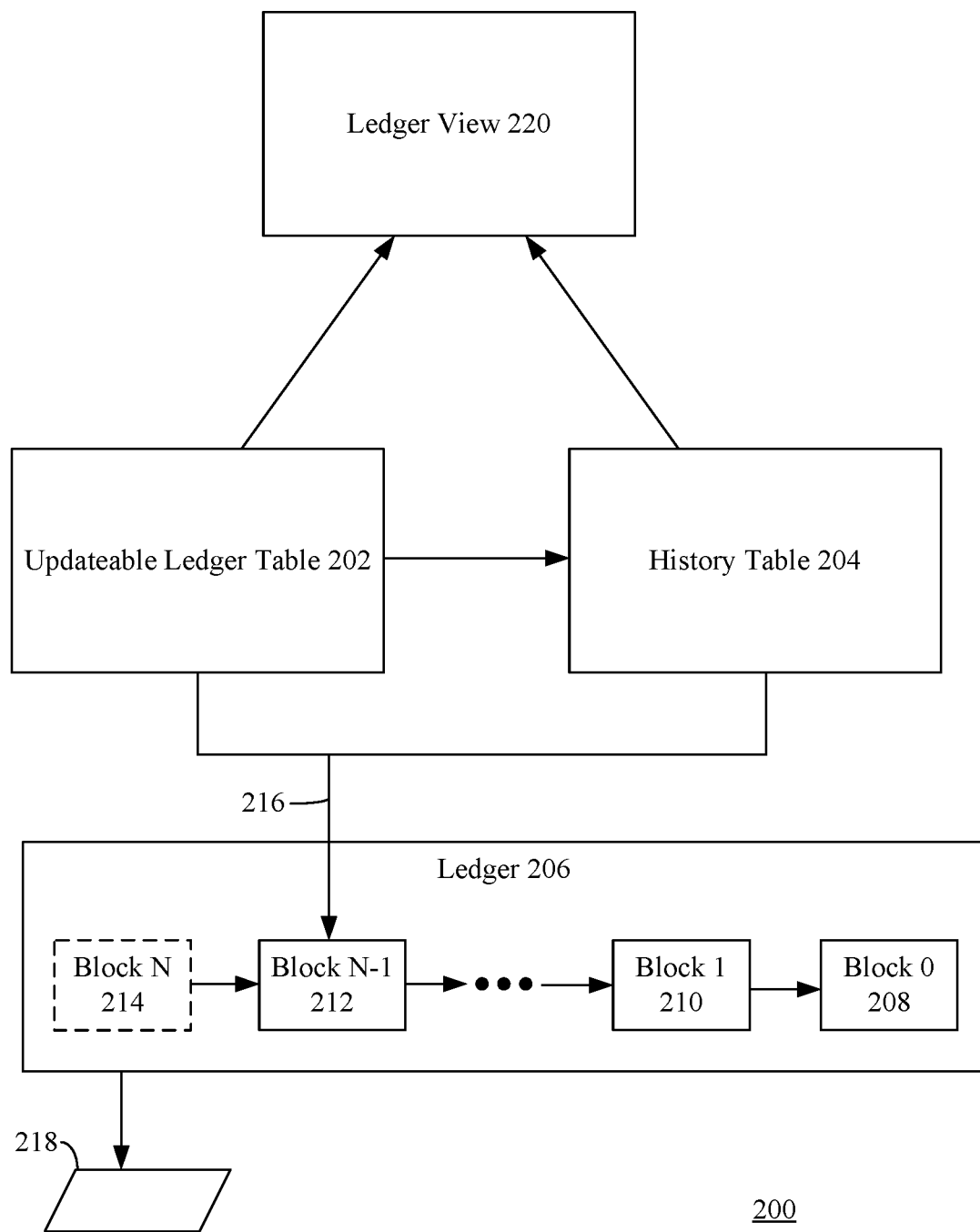
FIG. 2 depicts a block diagram of a ledger database in accordance with an example embodiment.

FIG. 2 depicts a block diagram of a ledger database 200 in accordance with an example embodiment. Ledger database 200 is an example of ledger database 106, a described above with reference to FIG. 1. As shown in FIG. 2, ledger database 200 comprises at least a current (or updateable) ledger table 202, a history table 204, and a ledger 206.

Current table 202 includes entries (or rows) of data, each entry having a number of columns (e.g., columns 114 and 116, as shown in FIG. 1). Current table 202 exemplarily includes, for illustrative purposes, an identity map (e.g., identity map 108, as shown in FIG. 1). Likewise, history table 204 includes similar, or the same, columns for rows of entries therein, but the rows of history table 204 include data reflecting each transaction that changes data in current table 202 (e.g., modify, delete, etc.). For example, if a row is updated in the database, its previous value is maintained and protected in history table 204.

Ledger 206 is a cryptographic data structure that comprises a blockchain. Ledger 206 includes a number of blocks having block IDs: a genesis block 208 (ID 'Block 0'), a first block 210 (ID 'Block 1'), etc., up to a current block 212 (ID 'Block N−1'), and it should be noted that additional blocks such as a future block 214 (ID 'Block N') may be generated for maintenance of the blockchain as additional entries are changed in current table 202 and prior entries are reflected in history table 204. Each block of the blockchain of ledger 206 includes at least a block ID, a hash value of the immediately preceding block (e.g., a SHA-256-based hash), and a root hash value representative of all the rows of the database post-update (e.g., a SHA-256 hash generated via a Merkle tree data structure), according to embodiments.

In the initial state of ledger 206, genesis block 208 (ID Block '0') has no meaningful prior hash value (zero) stored. However, after some time period in which transactions affect entries in current table 202 and history table 204, first block 210 (ID 'Block 1') is generated and completed which stores the hash value over 'Block 0'.

The root hash value of the latest block (e.g., current block 212) in ledger 206 is referred to as a digest (shown as digest 218), which captures a validity state of current table 202, history table 204, and ledger 206. In this way, a single hash value, e.g., in digest 218, enables verification to be performed on data in the database, e.g., in current table 202, history table 204, and ledger 206, that was present at and before generation of digest 218. Digest 218 is stored in secure storage and/or published (e.g., via a website) for use by users of computing devices 102A-102N (as shown in FIG. 1).

As an example, suppose Block N−2 is the current block in ledger 206 and a transaction is received to update current table 202. In this example, history table 204 is updated to store the information stored in current table 202, and current table 202 is updated in accordance with the transaction. A new block in ledger 206 for the transaction is generated (e.g., current block 212). A transaction hash value 216 is then generated over the entry in history table 204 and a changed entry in current table 202 that is generated by the transaction that was performed on the entry. Transaction hash value 216 is inserted into block 212. To generate the root hash value, the updated rows are inserted as leaf nodes of a hierarchical hash data structure, such as a Merkle tree. Each leaf node is then hashed (e.g., SHA-256 hashed) to generate a hash value for the leaf nodes. For each node that is not a leaf, a hash value is generated therefor that is based on the hash values of its child nodes. A root hash value of the hierarchical hash data structure (e.g., a root hash value of the root node of the hierarchical hash data structure) is then determined based on the hash values of its child nodes and utilized as the root hash value (and digest 218) stored in current block 212.

It is noted that any given block comprises any number of transactions. A new block is generated responsive to one or more events, including, but not limited to, expiry of a predetermined time period (e.g., 30 seconds), when a block reaches a maximum number of transactions (e.g., 100,000), etc.

Additionally, with respect to FIG. 2, embodiments provide for a view of a ledger (i.e., a ledger view table 220) that comprises a union of current table 202 and history table 204. Ledger view table 220 is queryable or otherwise operable via database operations and thus, provides a consolidate view of the current state of the data as well as all transactions previously performed on the current table.

Referring again to FIG. 1, information of identity map 108 is retrievable, e.g., via computing device 102A-102N. Identity map 108 is also modifiable to remove information or include new information.

Figure 3:
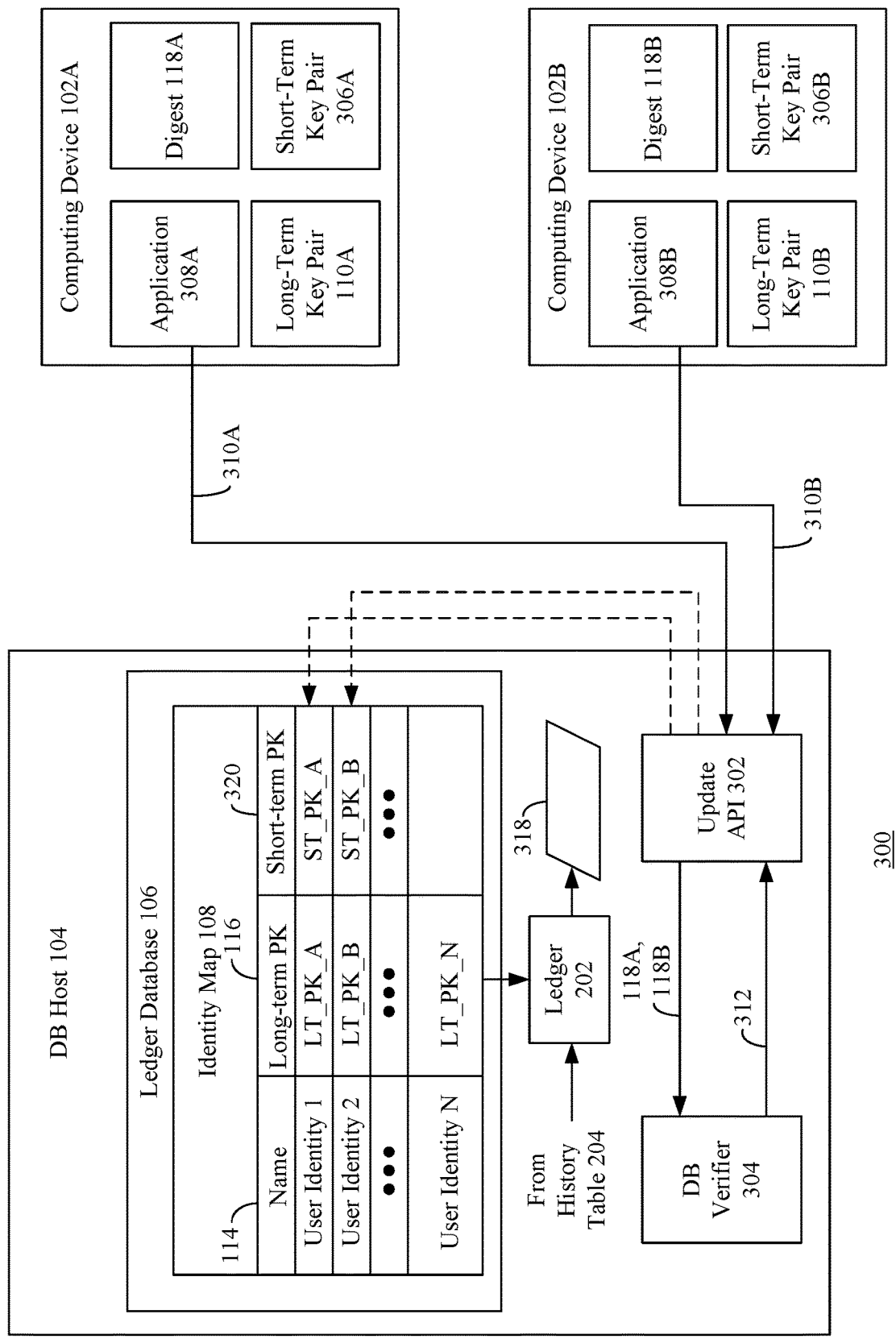
FIG. 3 depicts a block diagram of a system configured to update an identity map in accordance with an example embodiment.

FIG. 3 depicts a block diagram of a system 300 configured to update an identity map in accordance with an example embodiment. As shown in FIG. 3, system 300 comprises computing devices 102A-102B and DB host 104, a described above with reference to FIG. 1. DB host 104 executes ledger database 106 comprising identity map 108 and comprises ledger 202, an update application programming interface (API) 302 and a database verifier 304. As also shown in FIG. 3, computing device 102A comprises long-term signing key pair 110A, digest 118A, a short-term encryption key pair 306A, and an application 308A, and computing device 102B comprises long-term signing key pair 110B, digest 118B, a short-term encryption key pair 306B, and an application 308B. Each of applications 308A-308B is any software application in which a user desires encryption, for example, for data sharing or communications. Examples of applications 308A-308B include, but are not limited to, Microsoft Teams™ published by Microsoft Corporation of Redmond, WA, Microsoft Sharepoint™ published by Microsoft Corporation and/or the like.

Short-term encryption key pairs 306A-306B each comprise a short-term private encryption key and a short-term public encryption key. Each of short-term signing key pairs 306A-306B are generated by a trusted or customer-controlled service. Each of short-term encryption key pairs 306A-306B comprise randomly-generated numbers (e.g., the service comprises a random number generator that generates the short-term private encryption key and a short-term public encryption key). In accordance with an embodiment, the service executes locally on each of computing devices 102A-102N. In accordance with another embodiment, the service executes remotely from computing devices 102A-102N. In accordance with such an embodiment, short-term encryption key pairs 306A-306B are generated from a key generating web service, where computing devices 102A-102N submit a request to the service for a short-term key pair. Responsive to receiving the request, the service generates (e.g., randomly) the short-term key pair and provides the generated key pair to the requesting computing device via a response. In accordance with an embodiment, the service is a Proof of Possession (PoP)-based service; although it is noted that the embodiments described herein are not so limited.

The short-term private encryption key of pairs 306A-306B are respectively stored locally in a secure environment of a computing device of computing devices 102A-102N. Examples of a secure environment include, but are not limited to, a trusted platform module (TPM), a hardware security module (HSM), or any type of secure hardware and/or software-based cryptoprocessor.

Each of long-term key pairs 110A-110B and short-term key pairs 306A-306B are configured to expire after a predetermined time period, where the predetermined time period for long-term key pairs 110A-110B is relatively longer than the predetermined time period for short-term key pairs 306A-306B. For instance, each of long-term key pairs 110A-110B may expire after a week, a month, or year, whereas each of short-term key pairs 306A-306B may expire after a certain number of minutes, an hour, or a day.

A user is enabled to update information stored in identity map utilizing update API 302. Examples of information that is updateable includes, but is not limited, the user's identity, the long-term public signing key of the user and/or the short-term public encryption key of the user. In accordance with an embodiment, identity map 108 is configured such that only the user is allowed to update identity map 108 with their short-term public encryption key. This is achieved by signing the user's short-term public encryption key with the user's long-term private signing key, for example, by an application (e.g., application 308A or 308B). This advantageously prevents rogue users and the organization that maintains identity map 108 from tampering with keys of other users. The user may periodically update identity map 108 with new short-term public encryption keys as the old short-term public encryption key expires. This way, if the old short-term public encryption key is somehow compromised, the new short-term public encryption will be used.

To update identity map 108 with the short-term public encryption key of a user of computing device 102A, the short-term public encryption key is signed, for example, by application 308A, and application 308A sends a request 310A on behalf of the user to update API 302. In accordance with an embodiment, request 310A comprises digest 118A, which is representative of a state of ledger database 106, and the signed, short-term public encryption key of the user. In accordance with another embodiment, digest 118A and the signed, short-term public encryption key are included in separate requests to update API 302. It is noted in embodiments that a plurality of digests is provided to update API 302 via request(s), where the plurality of digests comprises some or all of the digests previously generated by ledger 202.

Update API 302 provides digest 118A to database verifier 304. Database verifier 304 validates ledger database 106 to determine whether ledger database 106 has been tampered with. For example, database verifier 304 generates a hierarchical hash data structure, such as a Merkle tree, based on the rows of tables (e.g., identity map 108) of ledger database 106. For instance, database verifier 304 generates a leaf node for each row of ledger database 106, where each leaf node comprises the contents of the corresponding row. Database verifier 304 then hashes each leaf node to generate a hash value for the leaf nodes. For instance, the contents of the leaf node are input into a hash function, which outputs the hash value. For each node that is not a leaf, database verifier 304 generates a hash value therefor that is based on the hash values of its child nodes. For instance, for a given node that is not a leaf, the hash values of its child nodes are input into a hash function, which outputs the hash value therefor. Database verifier 304 then generates a root hash value of the hierarchical hash data structure (e.g., a root hash value of the root node of the hierarchical hash data structure) based on the hash values of its child nodes. For instance, the hash values of its child nodes are input into a hash function, which outputs the root hash value.

Database verifier 304 then compares the determined root hash value to digest 118A received via request 310A. If the determined root hash value is equal to digest 118A, then database verifier 304 determines that ledger database 106 has not been tampered with and provides a notification 312 to update API 302 indicating that ledger database 106 has not been tampered with.

Responsive to receiving notification 312, update API 302 provides the short-term public encryption key to ledger database 106. Using the long-term public signing key of the user (e.g., LK_PK_A in column 116), ledger database 106 verifies that the short-term public encryption key was signed using the user's long-term private signing key. If ledger database 106 determines that the short-term public encryption key was signed using the user's long-term private signing key, ledger database 106 updates identity map 108 to include the short-term public encryption key. For instance, database host 104 stores the short-term public encryption key (e.g., ST_PK_A) in a column 320 of identity map 108 configured to store short-term public encryption keys. This way, the short-term public encryption key is associated with the long-term public signing key and the identity of the user.

If ledger database 106 determines that the short-term public encryption key was not signed using the user's long-term private signing key, ledger database 106 does not update identity map 108 with the short-term public encryption key. In accordance with an embodiment, update API 302 returns an error message to application 308A indicating that the short-term public encryption key was not successfully stored in identity map 108.

If the determined root hash value is not equal to digest 118A, then database verifier 304 determines that ledger database 106 has been tampered with and issues a notification to update API 302. In accordance with an embodiment, responsive to receiving the notification, update API 302 returns an error message to application 308A indicating that ledger database 106 has been tampered with and/or the short-term public encryption key was not successfully stored in identity map 108.

In accordance with an embodiment where some or all previously-generated digests are provided to update API 302, database verifier 304 verifies all such digests. This way, if an attacker manages to compromise ledger database 106 prior to the latest digest being generated and provides computing device(s) 102A-102B with that digest, database verifier 304 will still be able to verify that the ledger database 106 was compromised.

Computing device 102B updates identity map 108 in a similar fashion. For example, application 308B issues a request 310B to update API 302 on behalf of the user of computing device 102B to update API 302. In accordance with an embodiment, request 310B comprises digest 118B, which is representative of a state of ledger database 106, and the signed, short-term public encryption key of the user. In accordance with another embodiment, digest 118B and the signed, short-term public encryption key are included in separate requests to update API 302.

Database verifier 304 validates ledger database 106 by generating a root hash value representative of ledger database 106 in a similar manner as described above with respect to computing device 102A. Database verifier 304 then compares the determined root hash value to digest 118B received via request 310B. If the determined root hash value is equal to digest 118B, then database verifier 304 determines that ledger database 106 has not been tampered with and provides notification 312 to update API 302 indicating that ledger database 106 has not been tampered with.

Responsive to receiving notification 312, update API 302 provides the short-term public encryption key to ledger database 106. Using the long-term public signing key of the user (e.g., LK_PK_B in column 116), ledger database 106 verifies that the short-term public encryption key was signed using the user's long-term private signing key. If ledger database 106 determines that the short-term public encryption key was signed using the user's long-term private signing key, ledger database 106 updates identity map 108 to include the short-term public encryption key. For instance, database host 104 stores the short-term public encryption key (e.g., ST_PK_B) in a column 320 of identity map 108 configured to store short-term public encryption keys. This way, the short-term public encryption key is associated with the long-term public signing key and the identity of the user.

After some time, ledger 202 of database host 104 generates another digest 318 representative of the state of ledger database 106 in a similar manner as described above with reference to FIG. 2 based on identity map 108 (which is stored in updateable ledger table 202, as shown in FIG. 2) and history table 204 (as also shown in FIG. 2). The updated digest is made accessible to users of computing devices 102A-102B. In accordance with an embodiment, the organization that maintains identity map 108 publishes updated digest 318, for example, via a web page that is accessible to computing devices 102A-102B. In accordance with another embodiment, computing device(s) 102A-102B obtains updated digest 318 from database host 104. For example, database host 104 provides a request comprising digest 318 to computing devices 102A-102B, and computing devices 102A-102B store digest 318, for example, in a memory thereof. In another example, computing devices 102A-102B provide a request to database host 104 for digest 318, and database host 104 provides digest 318 to computing devices 102A-102B via a response.

Figure 4:
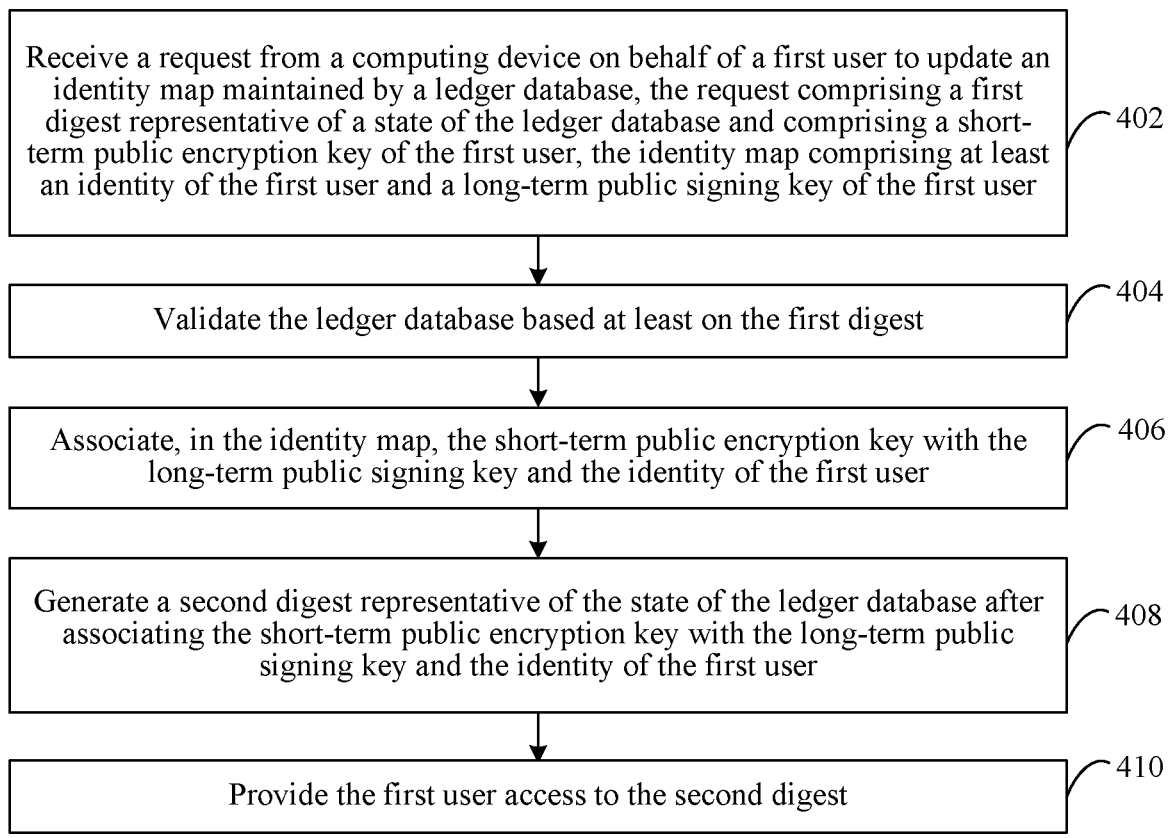
FIG. 4 shows a flowchart for updating an identity map in accordance with an example.

Accordingly, an identity map may be updated many ways. For example, FIG. 4 shows a flowchart 400 for updating an identity map, according to an example embodiment. In an embodiment, flowchart 400 is implemented by system 300, as shown in FIG. 3. Accordingly, flowchart 400 will be described with continued reference to FIG. 3. Other structural and operational embodiments will be apparent to persons skilled in the relevant art(s) based on the following discussion regarding flowchart 400 and system 300 of FIG. 3.

Flowchart 400 begins with step 402. In step 402, a request is received from a computing device on behalf of a first user to update an identity map maintained by a ledger database. The request comprises a first digest representative of a state of the ledger database and comprises a short-term public encryption key of the first user. The identity map comprises at least an identity of the first user and a long-term public signing key of the first user. For example, with reference to FIG. 3, update API 302 of database host 104 receives a request 310A from application 308A of computing device 102A to update identity map 108 maintained by ledger database 106. Request 310A comprises digest 118A and comprises a short-term public encryption key of short-term key pair 306A.

In accordance with one or more embodiments, the short-term public encryption key is signed by a long-term private signing key corresponding to the long-term public signing key. For example, with reference to FIG. 3, application 308A signs the short-term public encryption key of short-term key pair 306A with the long-term private signing key of long-term key pair 110A.

In accordance with one or more embodiments, the short-term public encryption key is configured to encrypt communications to the computing device. For example, with reference to FIG. 3, the short-term public encryption key (ST_PK_A) stored in identity map 108 is configured to encrypt communications to computing device 102A. Additional details regarding encrypting communications utilizing short-term public encryption keys are provided below with reference to FIG. 12.

In accordance with one or more embodiments, the identity comprises at least one of an email address of the first user, a username of the first user, or a phone number of the first user. For example, with reference to FIG. 3, User Identity 1 in column 114 of identity map 108 comprises at least one of an email address of the first user, a username of the first user, or a phone number of the first user.

In step 404, the ledger database is validated based at least on the first digest. For example, with reference to FIG. 3, update API 302 provides digest 118A to database verifier 304. Database verifier 304 validates ledger database 106 based at least on digest 118A. Additional details regarding validating ledger database 106 is described below with reference to FIGS. 9-11.

In step 406, responsive to said validating, the short-term public encryption key is associated with the long-term public signing key and the identity of the first user in the identity map. For example, with reference to FIG. 3, responsive to a successful validation of ledger database 106, update API 302 provides the short-term public encryption key to ledger database 106, and ledger database 106 associates, in identity map 108, the short-term public encryption key with the long-term public signing key and the identity of the first user. For example, ledger database 106 stores the short-term public encryption key (ST_PK_A) in column 320, thereby associating the short-term public encryption key with the long-term public signing key (LT_PK_A) stored in column 116 and the identity of the user stored in column 114.

In step 408, a second digest representative of the state of the ledger database is generated after associating the short-term public encryption key with the long-term public signing key and the identity of the first user. For example, with reference to FIG. 3, ledger 202 generates updated digest 318 representative of the state of ledger database 106 after associating the short-term public encryption key with the long-term public signing key and the identity of the first user.

In step 410, the first user is provided access to the second digest. For example, with reference FIG. 3, the user of computing device 102A is provided access to updated digest 318.

In accordance with one or more embodiments, the first user is provided access by at least one of publishing the second digest to a web page that is accessible to the computing device or providing the second digest to the computing device. For example, with reference to FIG. 3, database host 104 publishes updated digest 318 to a web page that is accessible to computing device 102A or provides updated digest 318 to computing device 102A. It is noted that in embodiments database host 104 provides access to some or all digests that are generated by ledger database 106 over time.

Figure 5:
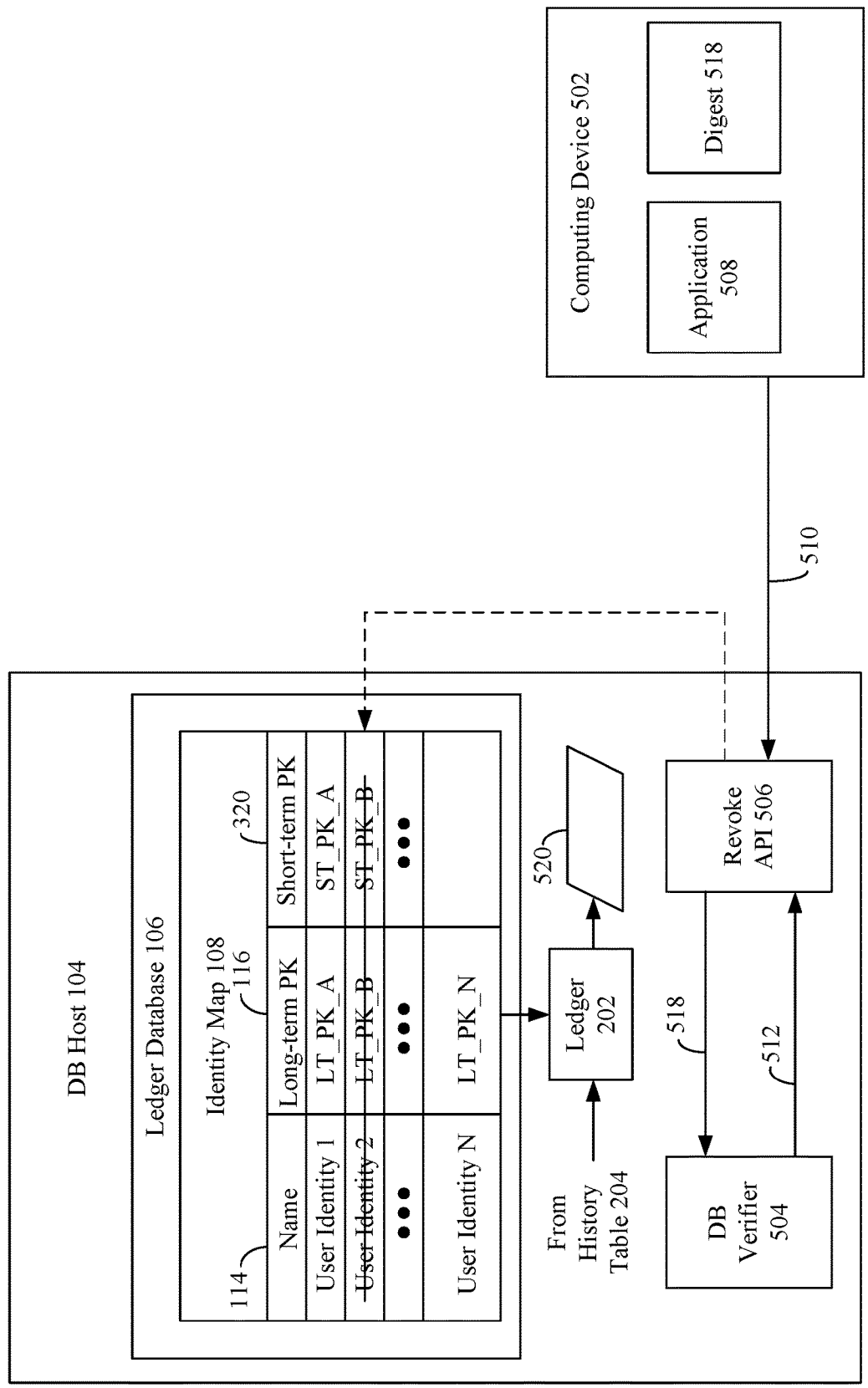
FIG. 5 depicts a block diagram of a system configured to remove information from an identity map in accordance with an example embodiment.

FIG. 5 depicts a block diagram of a system 500 configured to remove information from an identity map in accordance with an example embodiment. As shown in FIG. 5, system 500 comprises a computing device 502 and DB host 104, a described above with reference to FIG. 1. DB host 104 executes ledger database 106 comprising identity map 108 and comprises ledger 202, a revoke API 506 and a database verifier 504. Computing device 502 is an example of computing devices 102A-102N. In the example shown in FIG. 5, computing device 502 is associated with an administrator of the organization that maintains identity map 108. As also shown in FIG. 5, computing device 502 comprises an application 508 and a digest 518. Digest 518 is an example of digests 118A-118N, as described above with reference to FIG. 1. Application 508 is a software application that is utilized to access database host 104. In an embodiment in which identity map 108 is accessible over a network, application 508 is browser application (e.g., Microsoft Edge™ published by Microsoft Corporation).

In an example, an administrator would remove (or revoke) an identity and/or keys associated therewith of another user from identity map 108 in the event that the other user is no longer part of the organization. An administrator is enabled to remove information stored in identity map utilizing revoke API 506. For instance, the user causes application 508 to issue a request 510 on behalf of the administrator to revoke API 506. In accordance with an embodiment, request 510 comprises digest 518, which is representative of a state of ledger database 106, and the identity of the user for which key(s) are to be revoked. In accordance with another embodiment, digest 518 and the identity are included in separate requests to revoke API 506. It is noted in embodiments that a plurality of digests is provided to revoke API 506 via request(s), where the plurality of digests comprises some or all of the digests previously generated by ledger 202.

Revoke API 506 provides digest 518 to database verifier 504. Database verifier 504 is an example of database verifier 304, as described above with reference to FIG. 3. Database verifier 504 validates ledger database 106 to determine whether ledger database 106 has been tampered with. For example, database verifier 504 generates a hierarchical hash data structure, such as a Merkle tree, based on the rows of tables (e.g., identity map 108) of ledger database 106. For instance, database verifier 504 generates a leaf node for each row of ledger database 106, where each leaf node comprises the contents of the corresponding row. Database verifier 504 then hashes each leaf node to generate a hash value for the leaf nodes. For instance, the contents of the leaf node are input into a hash function, which outputs the hash value. For each node that is not a leaf, database verifier 504 generates a hash value therefor that is based on the hash values of its child nodes. For instance, for a given node that is not a leaf, the hash values of its child nodes are input into a hash function, which outputs the hash value therefor. Database verifier 504 then generates a root hash value of the hierarchical hash data structure (e.g., a root hash value of the root node of the hierarchical hash data structure) based on the hash values of its child nodes. For instance, the hash values of its child nodes are input into a hash function, which outputs the root hash value.

Database verifier 504 then compares the determined root hash value to digest 518 received via request 510. If the determined root hash value is equal to digest 518, then database verifier 504 determines that ledger database 106 has not been tampered with and provides a notification 512 to revoke API 506 indicating that ledger database 106 has not been tampered with.

Responsive to receiving notification 512, revoke API 506 provides the identity included in request 510 to ledger database 106. Ledger database 106 searches for an entry (or row) of identity map 108 that comprises the identity included in request 510. In the example shown in FIG. 5, the identity corresponds to User Identity 2 in column 114. After locating the entry, ledger database 106 removes the identity, the long-term public signing key (LT_PK_B) and/or the short-term public encryption key (ST_PK_B) associated therewith. In an example, request 510 specifies which of the long-term public signing key (LT_PK_B) and/or the short-term public encryption key (ST_PK_B) are to be removed.

If the determined root hash value is not equal to digest 518, then database verifier 504 determines that ledger database 106 has been tampered with and issues a notification to revoke API 506. In accordance with an embodiment, responsive to receiving the notification, revoke API 506 returns an error message to application 508 indicating that ledger database 106 has been tampered with and/or the identity, long-term public signing key, and/or the short-term public encryption key were not successfully removed from identity map 108.

In accordance with an embodiment where some or all previously-generated digests are provided to revoke API 506, database verifier 504 verifies all such digests. This way, if an attacker manages to compromise ledger database 106 prior to the latest digest being generated and provides computing device 502 with that digest, database verifier 504 will still be able to verify that the ledger database 106 was compromised.

After some time, ledger 202 of database host 104 generates another digest 520 representative of the state of ledger database 106 in a similar manner as described above with reference to FIG. 2 based on identity map 108 (which is stored in updateable ledger table 202, as shown in FIG. 2) and history table 204 (as also shown in FIG. 2). As described above with reference to FIG. 2, the information removed from identity map 108 is retained via history table 204. Updated digest 520 is made accessible to the administrator of computing device 502. In accordance with an embodiment, the organization that maintains identity map 108 publishes updated digest 520, for example, via a web page that is accessible to computing device 502. In accordance with another embodiment, computing device 502 obtains updated digest 520 from database host 104. For example, database host 104 provides a request comprising digest 520 to computing device 502, and computing device 502 stores digest 520, for example, in a memory thereof. In another example, computing device 502 provides a request to database host 104 for digest 520, and database host 104 provides digest 520 to computing device 502 via a response.

Figure 6:
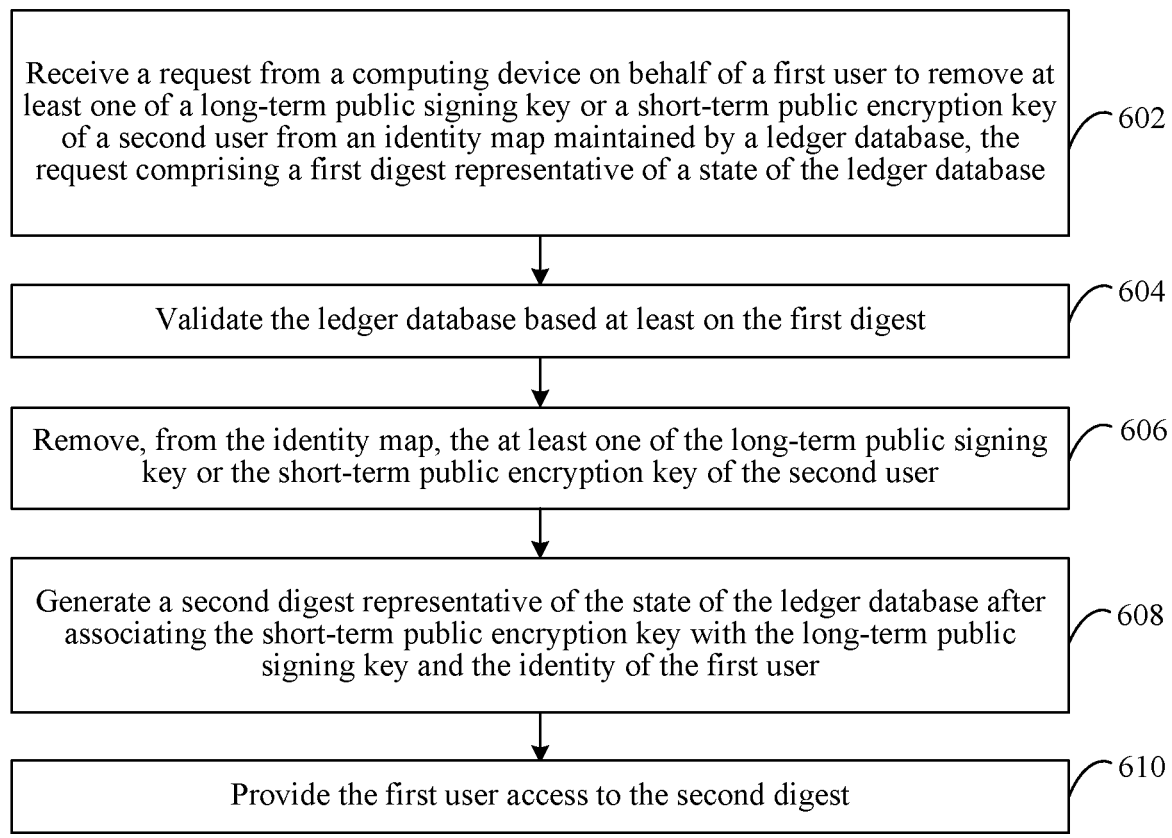
FIG. 6 shows a flowchart for removing information from an identity map in accordance with an example embodiment.

Accordingly, information from an identity map may be removed in many ways. For example, FIG. 6 shows a flowchart 600 for removing information from an identity map, according to an example embodiment. In an embodiment, flowchart 600 is implemented by system 500, as shown in FIG. 5, although the embodiments described herein are not so limited. Accordingly, flowchart 600 will be described with continued reference to FIG. 5. Other structural and operational embodiments will be apparent to persons skilled in the relevant art(s) based on the following discussion regarding flowchart 600 and system 500 of FIG. 5.

Flowchart 600 begins with step 602. In step 602, a request is received from a computing device on behalf of a first user to remove at least one of a long-term public signing key or a short-term public encryption key of a second user from an identity map maintained by a ledger database. The request comprises a first digest representative of a state of the ledger database. For example, with reference to FIG. 5, revoke API 506 of database host 104 receives a request 510 from application 308 of computing device 502 to update identity map 108 maintained by ledger database 106. Request 510 comprises digest 518.

In accordance with one or more embodiments, the short-term public encryption key is signed by a long-term private signing key corresponding to the long-term public signing key. For example, with reference to FIG. 5, a short-term public encryption key (ST_PK_B) is signed by a long-term private signing key (LT_PK_B).

In accordance with one or more embodiments, the identity comprises at least one of an email address of the second user, a username of the second user, or a phone number of the second user. For example, with reference to FIG. 5, User Identity 2 in column 114 of identity map 108 comprises at least one of an email address of the second user, a username of the second user, or a phone number of the second user.

In accordance with one or more embodiments, the request further comprises the identity of the second user. For example, with reference to FIG. 5, request 510 further comprises the identity (e.g., User Identity 2) of the second user.

In step 604, the ledger database is validated based at least on the first digest. For example, with reference to FIG. 5, revoke API 506 provides digest 518 to database verifier 504. Database verifier 504 validates ledger database 106 based at least on digest 518. Additional details regarding validating ledger database 106 is described below with reference to FIG. 9-11.

In step 606, responsive to said validating, the at least one of the long-term public signing key or the short-term public encryption key of the second user is removed from the identity map. For example, with reference to FIG. 5, responsive to a successful validation of ledger database 106, revoke API 506 removes the at least one of the long-term public signing key (LT_PK_B) or the short-term public encryption key (ST_PK_B) of the second user stored in columns 116 and 320.

In accordance with one or more embodiments, the identity of the second user and at least one of the long-term public signing key or the short-term public encryption key of the second user is removed from the identity map. For example, with reference to FIG. 5, the identity of the second user (User Identity 2) and at least one of the long-term public signing key (LT_PK_B) or the short-term public encryption key (ST_PK_B) of the second user is removed from identity map 108.

In step 608, a second digest representative of the state of the ledger database is generated after removing the at least one of the long-term public signing key or the short-term public encryption key of the second user. For example, with reference to FIG. 5, ledger 202 generates updated digest 520 representative of the state of ledger database 106 after removing the at least one of the long-term public signing key or the short-term public encryption key of the second user.

In step 610, the first user is provided access to the second digest. For example, with reference FIG. 5, the user of computing device 502 is provided access to updated digest 520.

In accordance with one or more embodiments, the first user is provided access by at least one of publishing the second digest to a web page that is accessible to the computing device or providing the second digest to the computing device. For example, with reference to FIG. 5, database host 104 publishes updated digest 520 to a web page that is accessible to computing device 502 or provides updated digest 520 to computing device 502.

Figure 7:
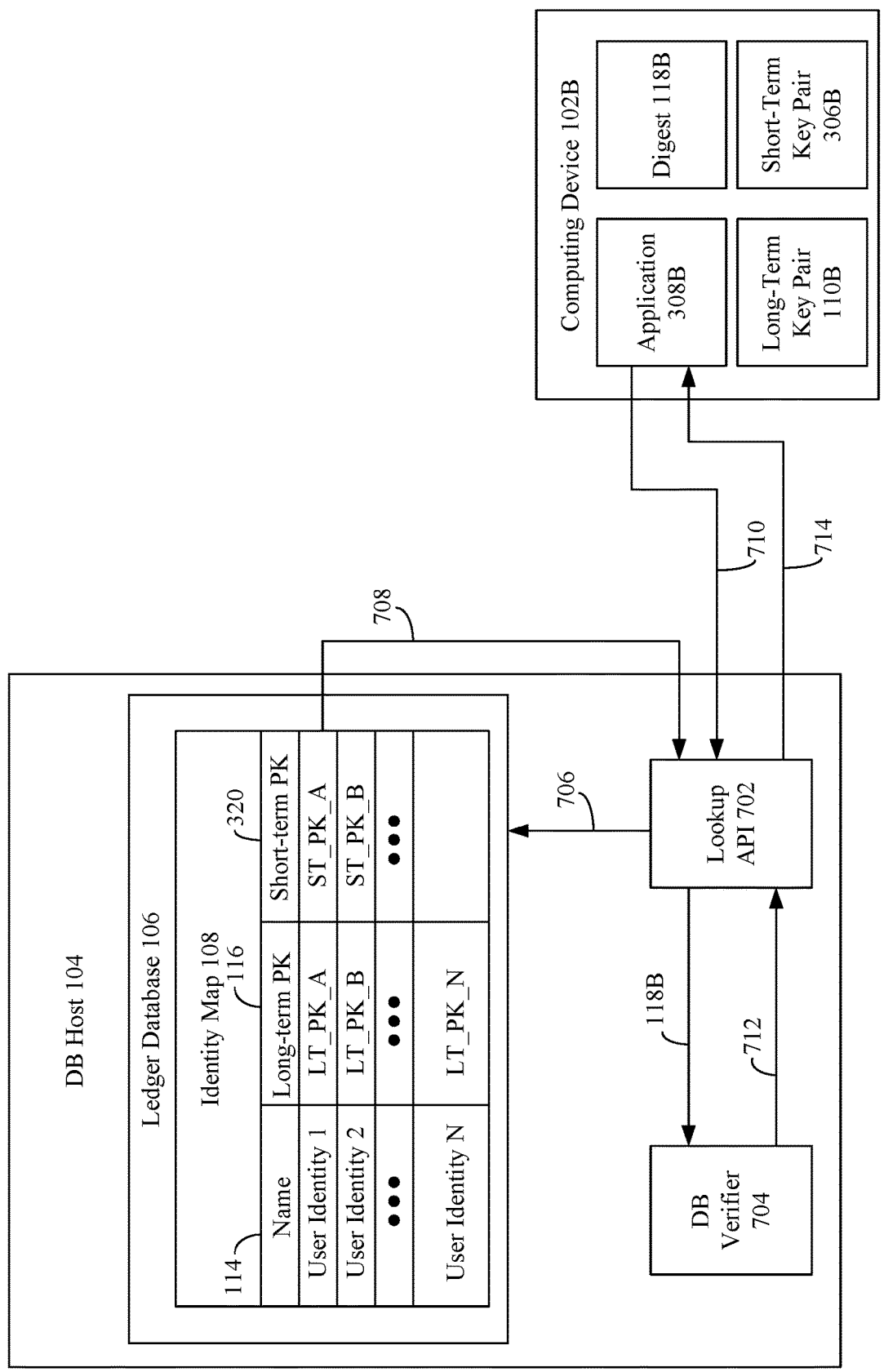
FIG. 7 depicts a block diagram of a system configured to retrieve information from an identity map in accordance with an example embodiment.

FIG. 7 depicts a block diagram of a system 700 configured to retrieve information from an identity map in accordance with an example embodiment. As shown in FIG. 7, system 700 comprises computing device 102B and DB host 104, a described above with reference to FIG. 1. DB host 104 executes ledger database 106 comprising identity map 108 and comprises ledger 202, a lookup API 702, and a database verifier 704. As also shown in FIG. 7, computing device 102B comprises long-term signing key pair 110B, digest 118B, a short-term encryption key pair 306B, and application 308B. Examples of application 308B include, but are not limited to, Microsoft Teams™ published by Microsoft Corporation of Redmond, WA, Microsoft SharePoint™ published by Microsoft Corporation and/or the like.

A user is enabled to lookup information stored in identity map 108 utilizing lookup API 702. Examples of information that may be looked up include, but are not limited, a user's identity, a long-term public signing key of a user and/or a short-term public encryption key of a user.

To lookup information from identity map 108, application 308A sends a request 710 on behalf of a user to lookup API 702. In accordance with an embodiment, request 710 comprises an identity of the user for which information being looked up and digest 118B, which is representative of a state of ledger database 106. In accordance with another embodiment, the identity and digest 118B are included in separate requests to lookup API 702. It is noted in embodiments that a plurality of digests is provided to lookup API 702 via request(s), where the plurality of digests comprises some or all of the digests previously generated by ledger 202.

Update API 702 provides digest 118B to database verifier 704. Database verifier 704 is an example of database verifier 504, as described above with reference to FIG. 5. Database verifier 704 validates ledger database 106 to determine whether ledger database 106 has been tampered with. For example, database verifier 704 generates a hierarchical hash data structure, such as a Merkle tree, based on the rows of tables (e.g., identity map 108) of ledger database 106. For instance, database verifier 704 generates a leaf node for each row of ledger database 106, where each leaf node comprises the contents of the corresponding row. Database verifier 704 then hashes each leaf node to generate a hash value for the leaf nodes. For instance, the contents of the leaf node are input into a hash function, which outputs the hash value. For each node that is not a leaf, database verifier 704 generates a hash value therefor that is based on the hash values of its child nodes. For instance, for a given node that is not a leaf, the hash values of its child nodes are input into a hash function, which outputs the hash value therefor. Database verifier 704 then generates a root hash value of the hierarchical hash data structure (e.g., a root hash value of the root node of the hierarchical hash data structure) based on the hash values of its child nodes. For instance, the hash values of its child nodes are input into a hash function, which outputs the root hash value.

Database verifier 704 then compares the determined root hash value to digest 118B received via request 710. If the determined root hash value is equal to digest 118B, then database verifier 704 determines that ledger database 106 has not been tampered with and provides a notification 712 to lookup API 702 indicating that ledger database 106 has not been tampered with.

Responsive to receiving notification 712, lookup API 702 provides a search query 706 to ledger database 106. Search query 706 comprises the identity specified by request 710. Upon locating an entry of ledger database 106 that comprises the identity, ledger database 106 returns information associated therewith (e.g., the long-term public signing key and/or the short-term public encryption key associated with the identity) to lookup API 702 via a response 708. Lookup API 701 provides the lookup information to application 308 via a response 714.

If the determined root hash value is not equal to digest 118B, then database verifier 704 determines that ledger database 106 has been tampered with and issues a notification to lookup API 702. In accordance with an embodiment, responsive to receiving the notification, lookup API 702 returns an error message to application 308B indicating that ledger database 106 has been tampered with and/or that lookup operation was not completed.

In accordance with an embodiment where some or all previously-generated digests are provided to lookup API 702, database verifier 704 verifies all such digests. This way, if an attacker manages to compromise ledger database 106 prior to the latest digest being generated and provides computing device 102B with that digest, database verifier 704 will still be able to verify that the ledger database 106 was compromised.

Figure 8:
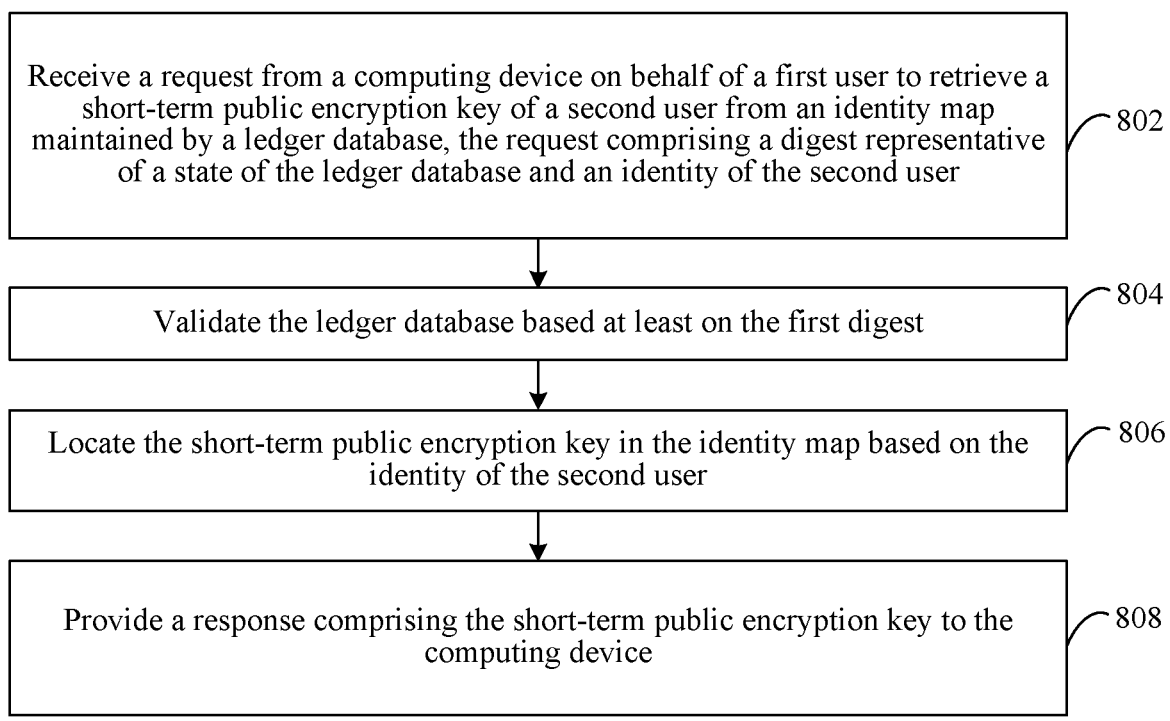
FIG. 8 shows a flowchart for retrieving information from an identity map in accordance with an example embodiment.

Accordingly, information from an identity map may be retrieved in many ways. For example, FIG. 8 shows a flowchart 800 for retrieving information from an identity map, according to an example embodiment. In an embodiment, flowchart 800 is implemented by system 700, as shown in FIG. 7, although the embodiments described herein are not so limited. Accordingly, flowchart 800 will be described with continued reference to FIG. 7. Other structural and operational embodiments will be apparent to persons skilled in the relevant art(s) based on the following discussion regarding flowchart 800 and system 700 of FIG. 7.

Flowchart 800 begins with step 802. In step 802, a request is received from a computing device on behalf of a first user to retrieve a short-term public encryption key of a second from an identity map maintained by a ledger database and an identity of the second user. The request comprises a digest representative of a state of the ledger database and comprises an identity of the second user. For example, with reference to FIG. 7, lookup API 702 of database host 104 receives a request 710 from application 308B of computing device 102B to retrieve information from identity map 108 maintained by ledger database 106. Request 710 comprises digest 118B and comprises an identity (e.g., User Identity 1) of the second user.

In accordance with one or more embodiments, the short-term public encryption key is signed by a long-term private signing key corresponding to the long-term public signing key. For example, with reference to FIG. 7, application 308B signs the short-term public encryption key of short-term key pair 306B with the long-term private signing key of long-term key pair 110B.

In accordance with one or more embodiments, the short-term public encryption key is configured to encrypt communications from the computing device of the first user to a computing device of the second user. For example, with reference to FIG. 7, the short-term public encryption key (ST_PK_A) stored in identity map 108 is configured to encrypt communications from computing device 102B to another computing device (e.g., computing device 102A) of the second user. Additional details regarding encrypting communications utilizing short-term public encryption keys are provided below with reference to FIG. 12.

In accordance with one or more embodiments, the identity comprises at least one of an email address of the second user, a username of the second user, or a phone number of the second user. For example, with reference to FIG. 7, User Identity 1 in column 114 of identity map 108 comprises at least one of an email address of the second user, a username of the second user, or a phone number of the second user.

In step 804, the ledger database is validated based at least on the digest. For example, with reference to FIG. 7, lookup API 702 provides digest 118B to database verifier 704. Database verifier 704 validates ledger database 106 based at least on digest 118B. Additional details regarding validating ledger database 106 is described below with reference to FIG. 9-11.

In step 806, responsive to said validating, the short-term public encryption key is located in the identity map based on the identity of the second user. For example, with reference to FIG. 7, lookup API 702 provides search query 706 to ledger database 106, and ledger database 106 searches for an entry in ledger database 106 that comprises the identity. After locating the entry, ledger database 106 locates the short-term public encryption key associated with the identity in identity map 108 and provides the short-term public encryption key to lookup API 702 via response 708.

In accordance with one or more embodiments, responsive to said validating, a long-term public signing key in the identity map is located based on the identity of the second user. For example, with reference to FIG. 7, responsive to search query 706, ledger database 106 locates the long-term public signing key associated with the identity in identity map 108.

In step 808, a response is provided to the computing device that comprises the short-term public encryption key. For example, with reference to FIG. 7, lookup API 702 provides response 714 comprising the short-term public encryption key (ST_PK_A) to computing device 102B.

In accordance with one or more embodiments, the response further comprises the long-term public signing key. For example, with reference to FIG. 7, lookup API 702 provides the long-term public encryption key to computing device 102B via a response (e.g., response 708).

Figure 9:
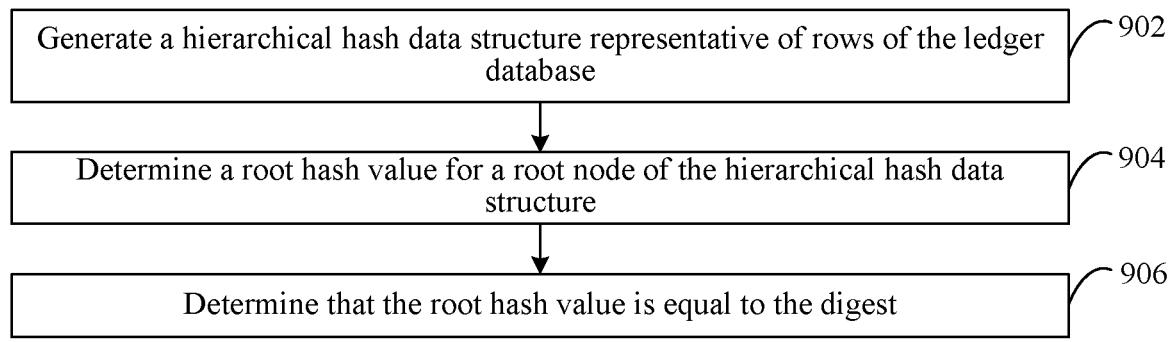
FIG. 9 shows a flowchart for validating a ledger database in accordance with an example embodiment.
Figure 10:
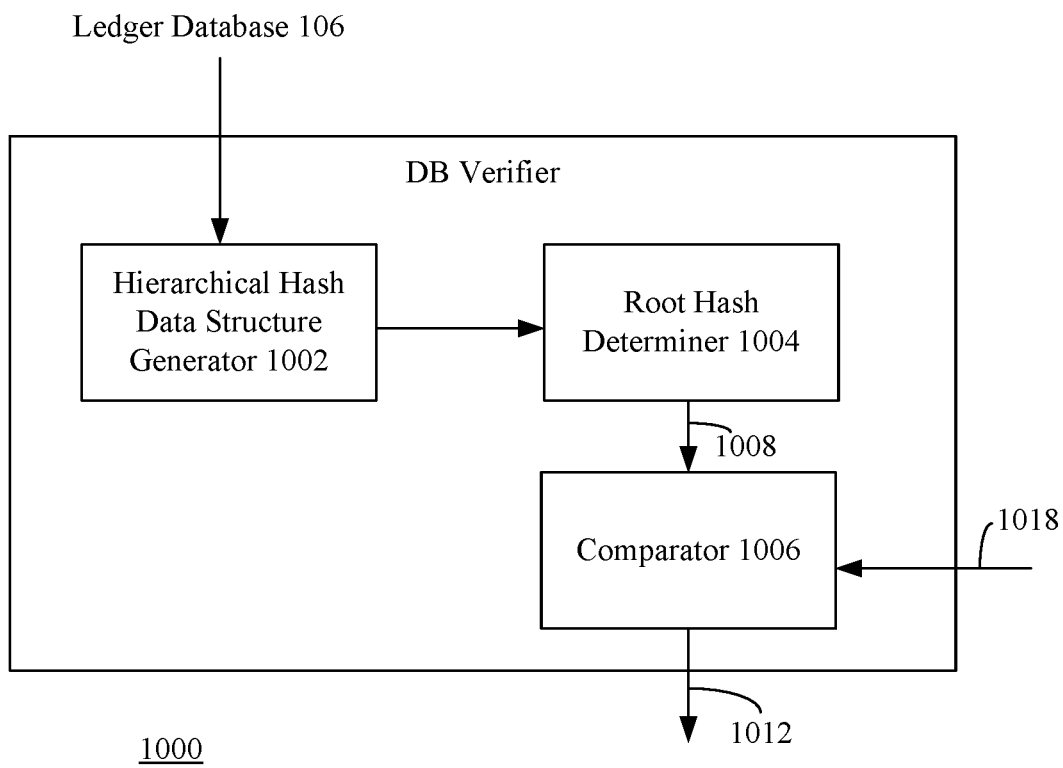
FIG. 10 depicts a block diagram of a database verifier in accordance with an example embodiment.
Figure 11:
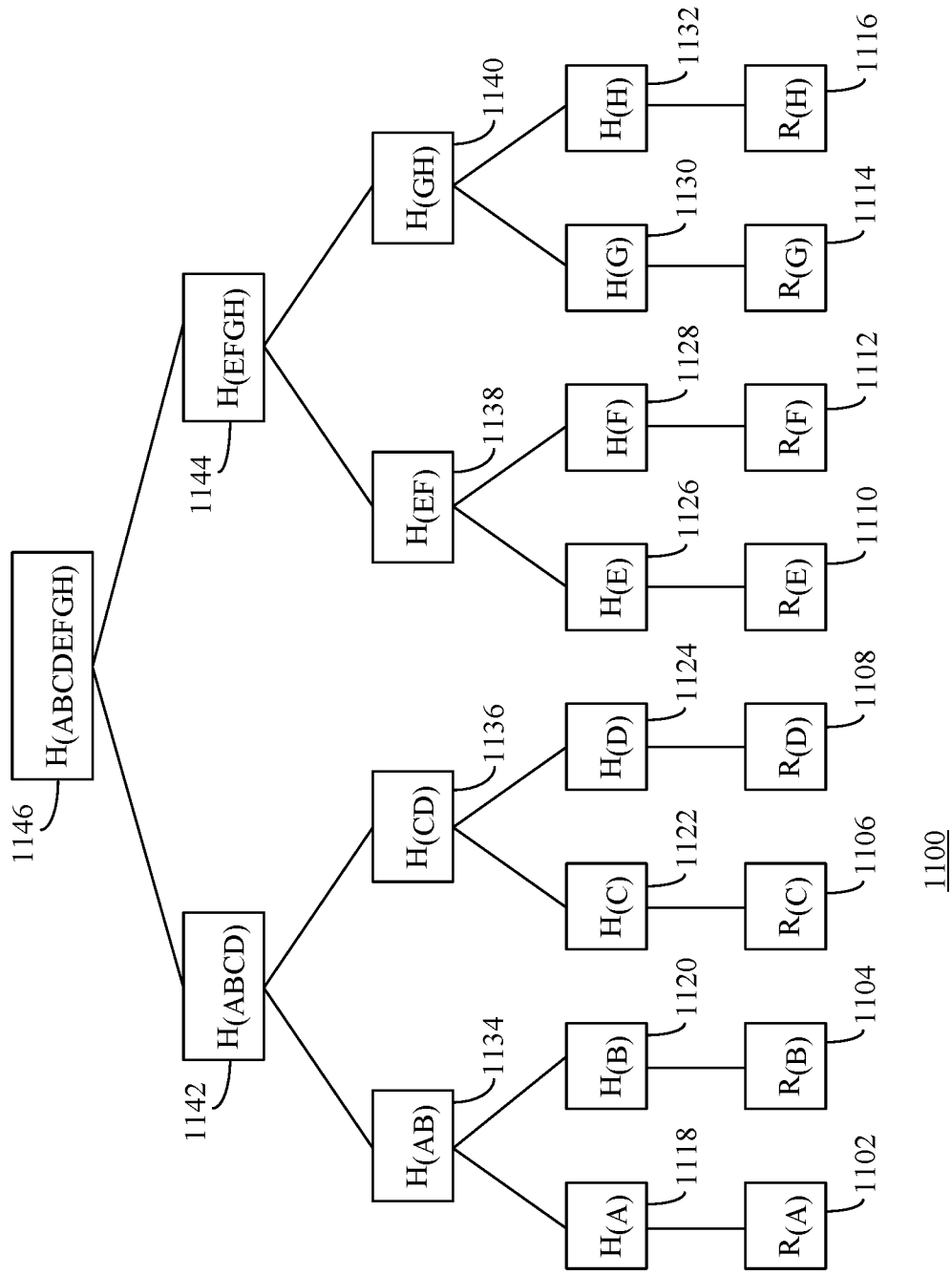
FIG. 11 depicts a block diagram of a hierarchical hash data structure in accordance with an example embodiment.

FIG. 9 shows a flowchart 900 for validating a ledger database, according to an example embodiment. In an embodiment, flowchart 900 is implemented by a database verifier 1000, as shown in FIG. 10. FIG. 10 depicts a block diagram of database verifier 1000 in accordance with an example embodiment. Database verifier 1000 is an example of database verifier 304, 504, or 704, as respectively described above with reference to FIGS. 3, 5, and 7. As shown in FIG. 10, database verifier 1000 comprises a hierarchical hash data structure generator 1002, a root hash determiner 1004, and a comparator 1006. An example of a hierarchical hash data structure is shown in FIG. 11. Other structural and operational embodiments will be apparent to persons skilled in the relevant art(s) based on the following discussion regarding flowchart 900 and database verifier 1000 of FIG. 10.

Flowchart 900 begins with step 902. In step 902, a hierarchical hash data structure representative of the rows of the ledger database is generated. For example, with reference to FIGS. 10 and 11, hierarchical hash data structure generator 1002 generates a hierarchical hash data structure 1110 representative of the rows of ledger database 106. With further reference to FIG. 11, hierarchical hash data structure generator 1002 initially generates leaf nodes 1118-1132, each of which is corresponding to a respective row of rows 1102-1116 of ledger database 106. Hierarchical hash data structure generator 1002 generates a hash value for each of leaf nodes 1118-1132, which is based on the data stored in a corresponding row. For instance, the data of row 1102 is provided to a hash function (e.g., a SHA-256 based hash function) that generates a hash value $H_{(A)}$, which is stored in leaf node 1118. The data of row 1104 is provided to a hash function that generates a hash value $H_{(B)}$, which is stored in leaf node 1120. The data of row 1106 is provided to a hash function that generates a hash value $H_{(C)}$, which is stored in leaf node 1122. The data of row 1108 is provided to a hash function that generates a hash value $H_{(D)}$, which is stored in leaf node 1124. The data of row 1110 is provided to a hash function that generates a hash value $H_{(E)}$, which is stored in leaf node 1126. The data of row 1112 is provided to a hash function that generates a hash value $H_{(F)}$, which is stored in leaf node 1128. The data of row 1114 is provided to a hash function that generates a hash value $H_{(G)}$, which is stored in leaf node 1130. The data of row 1116 is provided to a hash function that generates a hash value $H_{(H)}$, which is stored in leaf node 1132.

Hierarchical hash data structure generator 1002 then generates parent nodes 1134-1140 based on the hash values of their respective children. For instance, the hash values of nodes 1118 and 1120 are provided to a hash function that generates a hash value $H_{(AB)}$, which is stored in node 1134. The hash values of nodes 1122 and 1124 are provided to a hash function that generates a hash value $H_{(CD)}$, which is stored in node 1136. The hash values of nodes 1126 and 1128 are provided to a hash function that generates a hash value $H_{(EF)}$, which is stored in node 1138. The hash values of nodes 1130 and 1132 are provided to a hash function that generates a hash value $H_{(GH)}$, which is stored in node 1140.

The foregoing process continues until a single root node is generated for all the rows of ledger database 106. For instance, as further shown in FIG. 11, hierarchical hash data structure generator 1002 then generates parent nodes 1134-1140 based on the hash values of their respective children. For instance, the hash values of nodes 1134 and 1136 are provided to a hash function that generates a hash value $H_{(ABCD)}$, which is stored in node 1142. The hash values of nodes 1138 and 1140 are provided to a hash function that generates a hash value $H_{(EFGH)}$, which is stored in node 1140. Hierarchical hash data structure generator 1002 then generates a parent node 1146 based on the hash values of its respective children. For instance, the hash values of nodes 1142 and 1144 are provided to a hash function that generates a hash value $H_{(ABCDEFGH)}$, which is stored in node 1146. Node 1146 is the root node of hierarchical hash data structure generator 1002.

In accordance with one or more embodiments, the hierarchical hash data structure is a Merkle tree. For example, with reference to FIG. 11, hierarchical hash data structure 1100 is a Merkle tree.

In step 904, a root hash value for the root node of the hierarchical hash data structure is determined. For example, with reference to FIGS. 10 and 11, root hash determiner 1004 determines the root hash value (e.g., $H_{(ABCDEFGH)}$) of root node 1146. Root hash determiner 1104 provides the root hash value (shown as root hash value 1008) to comparator 1106.

In step 906, a determination is made that the root hash value is equal to the digest. For example, with reference to FIG. 10, comparator 1006 compares root hash value 1008 to a digest 1018 to determine whether they are equal to each other. In response to determining that they are equal to each other, comparator 1006 determines that ledger database 106 has not been tampered with and provides a notification 1012 indicating as much. Notification 1012 is an example of notifications 312, 512, and 712, as respectively described above with reference to FIGS. 3, 5, and 7. Digest 1018 is an example of digests 118A, 118B and 518, as respectively described above with reference to FIGS. 1, 3, 5, and 7.

III. Additional Embodiments

A. Signature Chains

When a user wants to associate a new computing device's public keys to the user's identity, the new device's public keys are authorized by a previously-authorized public key (e.g., a previously-authorized public signing key digitally signs the new public keys). In other words, a new device of a user is authorized by one of the existing devices of the same user. For instance, suppose a user is provisioned a new device by the user's organization. The long-term public signing key of the user's original device is used to sign the long-term public signing key and/or short-term public encryption key of the user's new device. The foregoing technique is referred to as signature chaining, as each key in the signature chain is authorized by a previously-authorized signing key.

In accordance with an embodiment, the user obtains an initial verifiable binding between the user's identity and the user's public keys, for example, via an identity provider (e.g., Azure Active Directory™ by Microsoft Corporation). In an embodiment, the initial binding is signed by an administrator's signing key. In another embodiment, the initial binding is signed by a signing key that is already stored in identity map 108 for a different user (e.g., a manager).

At lookup time, the validity of the long-term public signing key used to sign the keys of the new device, as well as keys of the new device are verified. Such signature chains advantageously prevent an adversary from associating rogue public keys for any user in the system.

B. Local Verification

In the embodiments described above, a database verifier (e.g., database verifiers 304, 504, and 704) executing on database host 104 verifies whether ledger database 106 has been tampered with. In accordance with one or more other embodiments, the verification is performed locally on a computing device (e.g., computing devices 102A-102N). The foregoing is achievable using proofs of the hierarchical hash data structure (e.g., Merkle proofs), which are maintained by the database host (e.g., database host 104).

For instance, as described above, a computing device obtains a digest (e.g., digest 118A-118N) from ledger database 108 and stores the digest locally. When performing a lookup operation (as described above with reference to FIGS. 7-8), the computing device provides a request (e.g., request 710) to a lookup API (e.g., lookup API 702) for a short-term public encryption key of a particular user. In response, ledger database 106 provides a response comprising the short-term public encryption key, along with a proof of membership. The proof of membership comprises all the hashes associated with the short-term public encryption key that are needed to be combined to obtain the root hash value of ledger database 106. For example, with reference to FIG. 11, suppose the requested short-term public encryption key is included in $R_{(C)}$. In this example, the hash values stored in nodes 1124, 1134, and 1144 would be provided as the proof of membership, as these hash values are required to reconstruct the root hash value.

The computing device generates a hash value of the requested short-term public encryption key and provides the hash value and the received hash value of node 1124 to a hash function, which generates a hash value $H_{(CD)}$. The computing device then provides hash value $H_{(CD)}$ and the received hash value of node 1134 to a hash function, which generates a hash value $H_{(ABCD)}$. The computing device then provides hash value $H_{(ABCD)}$ and the received hash value of node 1144 to a hash function, which generates a hash value $H_{(ABCDEFGH)}$. Using this technique, the computing device has generated a version of the root hash value. The computing device then compares the generated root hash value to the digest maintained thereby to determine whether they are equal. If they are equal, then the computing device determines that ledger database 106 has not been tampered with.

The computing device then verifies the validity of the short-term public encryption key by determining whether the short-term public encryption key was signed by the associated user's long-term private encryption key, as described above.

Responsive to determining that ledger database 106 has not been tampered with and validating the short-term public encryption key, the computing device determines that the short-term public encryption key is valid and uses it accordingly.

The foregoing technique advantageously enables the computing device to verify the short-term public encryption key without having to download the entire dataset of ledger database 106, thereby conserving compute resources (e.g., processing cycles, memory, storage, input/output (I/O) transactions, power, etc.).

It is noted that in accordance with one or more embodiments, the computing device stores locally (or caches) keys of other users. In this case, the computing device also compares the key to the locally-cached version of the key to determine whether they are consistent as an additional verification check.

C. Encrypted Communications

Figure 12:
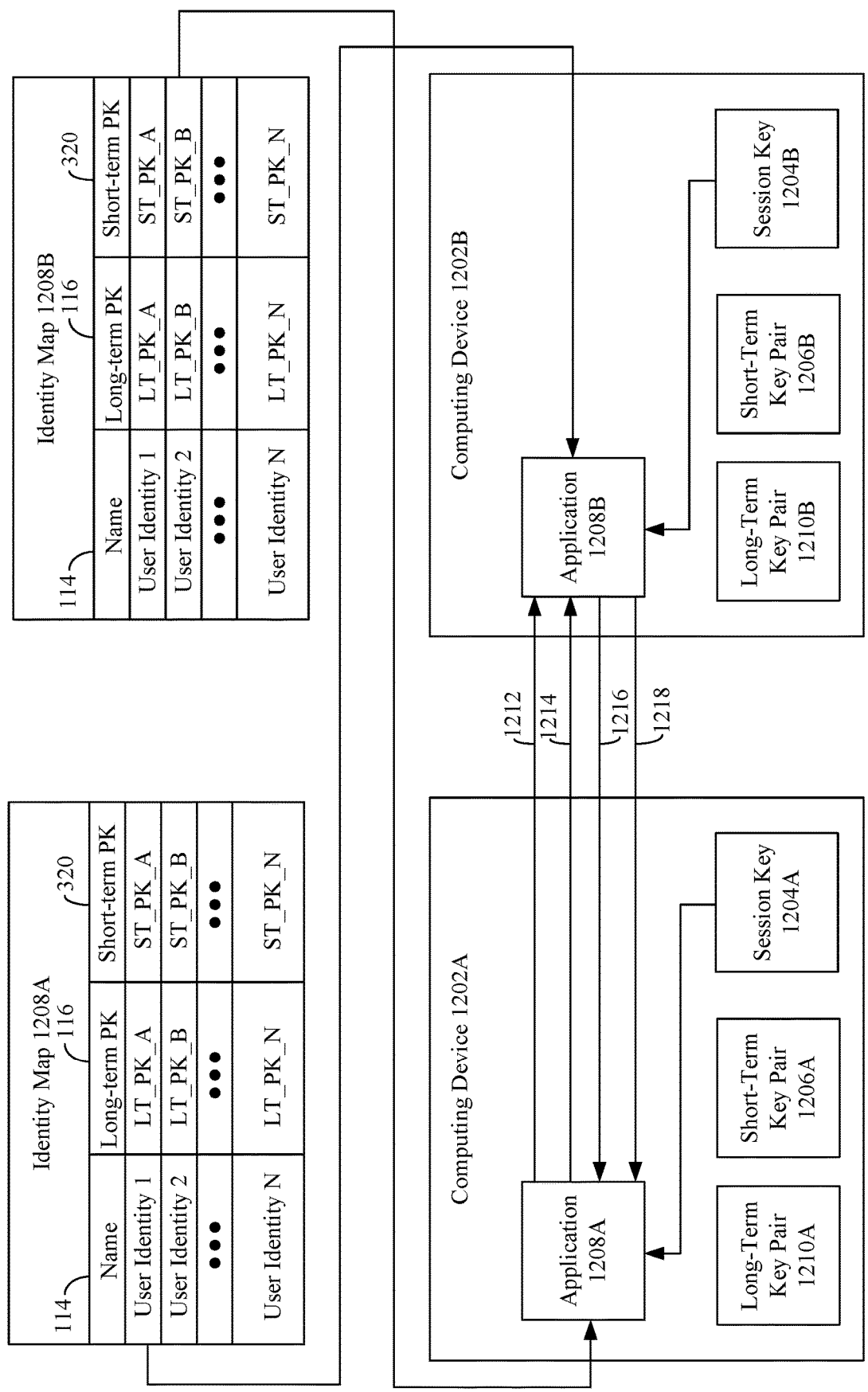
FIG. 12 depicts a block diagram of a system for encrypting communications between two parties from different organizations in accordance with an example embodiment.

As described herein, identity map 108 is utilized to enable encrypted communications between different parties, either belonging to the same or different organizations. In an embodiment in which parties from different organizations intend to communicate, each organization publishes the public keys of their members, and each party obtains the public keys accordingly. FIG. 12 depicts a block diagram of a system 1200 for encrypting communications between two parties from different organizations in accordance with an example embodiment. As shown in FIG. 12, system 1200 comprises an identity map 1208A, an identity map 1208B, a computing device 1202A, and a computing device 1202B. Identity maps 1208A and 1208B are examples of identity map 108 and computing devices 1202A and 1202B are examples of computing devices 102A-102C, as described above.

Identity map 1208A is maintained by a first organization, and computing device 1202A is associated with a first user of the first organization. Identity map 1208B is maintained by a second organization, and computing device 1202B is associated with a second user of the second organization. The first organization makes identity map 1208B publicly-accessible, e.g., by publishing identity map 1208A to a first website or making identity map 1208A available via ledger database 106, and the second organization makes identity map 1208B publicly-accessible, e.g., by publishing identity map 1208B to a second website or making identity map 1208A available via ledger database 106.

Computing device 1202A comprises an application 1208A, a long-term key pair 1210A, a short-term key pair 1206A, and a random session key 1204A. Computing device 1202B comprises an application 1208B, a long-term key pair 1210B, a short-term key pair 1206B, and a random session key 1204B. Applications 1208A and 1208B are examples of applications 308A and 308B, as described above with reference to FIG. 3. Long-term key pairs 1210A and 1210B are examples of long-term key pairs 110A and 110B, as described above with reference to FIG. 3. Short-term key pairs 1206A and 1206B are examples of short-term key pairs 306A and 306B, as described above with reference to FIG. 3.

Suppose the first user of computing device 1202A wants to send an encrypted communication to the second user of computing device 1202B utilizing application 1208A, which, for example, is a messaging application. In this example, the user obtains the short-term public encryption key of the second user from identity map 1208B. In the example shown in FIG. 12, the second user's short-term public encryption key corresponds to ST_PK_B. In accordance with an embodiment, the user obtains the short-term public encryption key from a website on which it is published. In accordance with another embodiment, application 1208A obtains the short-term public encryption key from ledger database 108 via lookup API 702, as described above with reference to FIGS. 7-8.

Application 1208A then obtains a random session key 1204A. For instance, as shown in FIG. 12, computing device 1202A stores random session key 1204A. Random session key 1204A is generated by a trusted or customer-controlled service. Random session key 1204 is a randomly-generated number (e.g., the service comprises a random number generator that generates session key 1204A). In accordance with an embodiment, the service executes locally on each of computing devices 1202A-1202B. In accordance with another embodiment, the service executes remotely from computing devices 1202A-1202B. In accordance with such an embodiment, session key 1204A is generated from a key generating web service, where computing devices 1202A-1202B submit a request to the service for a random session key. Responsive to receiving the request, the service generates (e.g., randomly) the random session key to the requesting computing device via a response. In accordance with an embodiment, the service is a Proof of Possession (PoP)-based service; although it is noted that the embodiments described herein are not so limited.

Application 1208A then encrypts messages to be sent to application 1208B of the second user using random session key 1204A. Application 1208A also encrypts random session key 1204A with the short-term public encryption key of the second user (e.g., ST_PK_B). Application 1208A then sends both the encrypted message (shown as encrypted message 1212) and the encrypted random session key (shown as encrypted random session key 1214) to application 1208B of the second user via one or more requests.

Application 1208B decrypts encrypted random session key 1214 using the short-term private encryption key of short-term key pair 1206B of the second user to obtain the random session key. Application 1208B then decrypts encrypted message 1212 using the decrypted random session key.

Similarly, to send an encrypted message from the second user to the first user, application 1208B obtains random session key 1204B in a similar manner as described above with reference to random session key 1204A. Application 1208B then encrypts messages to be sent to application 1208A of the first user using random session key 1204B. Application 1208B also encrypts random session key 1204B with the short-term public encryption key of the first user (e.g., ST_PK_A). Application 1208B then sends both the encrypted message (shown as encrypted message 1216) and the encrypted random session key (shown as encrypted random session key 1218) to application 1208A of the first user via one or more requests.

Application 1208A decrypts encrypted random session key 1218 using the short-term private encryption key of short-term key pair 1206A of the first user to obtain the random session key. Application 1208A then decrypts encrypted message 1216 using the decrypted random session key.

IV. Example Mobile Device and Computer System Implementation

The systems and methods described above in reference to FIGS. 1-12, may be implemented in hardware, or hardware combined with one or both of software and/or firmware. For example, system 1300 of FIG. 13 may be used to implement any of database host 104, ledger database 106, identity map 108, ledger 206, updateable ledger table 202, history table 204, applications 308A-308B, update API 302, database verifier 304, revoke API 506, database verifier 504, application 508, lookup API 702, database verifier 704, database verifier 1000, hierarchical hash data structure 1002, root hash determiner 1004, comparator 1006, hierarchical hash data structure 1100, identity maps 1208A-1208B, and/or applications 1208A-1208B, and/or any of the components respectively described therein, and flowcharts 400, 600, 800, and/or 900 may be each implemented as computer program code/instructions configured to be executed in one or more processors and stored in a computer readable storage medium. Alternatively, computing devices 102A-102N, database host 104, ledger database 106, identity map 108, ledger 206, updateable ledger table 202, history table 204, applications 308A-308B, update API 302, database verifier 304, revoke API 506, database verifier 504, application 508, lookup API 702, database verifier 704, database verifier 1000, hierarchical hash data structure 1002, root hash determiner 1004, comparator 1006, hierarchical hash data structure 1100, computing devices 1202A-1202B, identity maps 1208A-1208B, and/or applications 1208A-1208B, and/or any of the components respectively described therein, and flowcharts 400, 600, 800, and/or 900 may be implemented as hardware logic/electrical circuitry. In an embodiment, any of computing devices 102A-102N, database host 104, ledger database 106, identity map 108, ledger 206, updateable ledger table 202, history table 204, applications 308A-308B, update API 302, database verifier 304, revoke API 506, database verifier 504, application 508, lookup API 702, database verifier 704, database verifier 1000, hierarchical hash data structure 1002, root hash determiner 1004, comparator 1006, hierarchical hash data structure 1100, computing devices 1202A-1202B, identity maps 1208A-1208B, and/or applications 1208A-1208B, and/or any of the components respectively described therein, and flowcharts 400, 600, 800, and/or 900 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
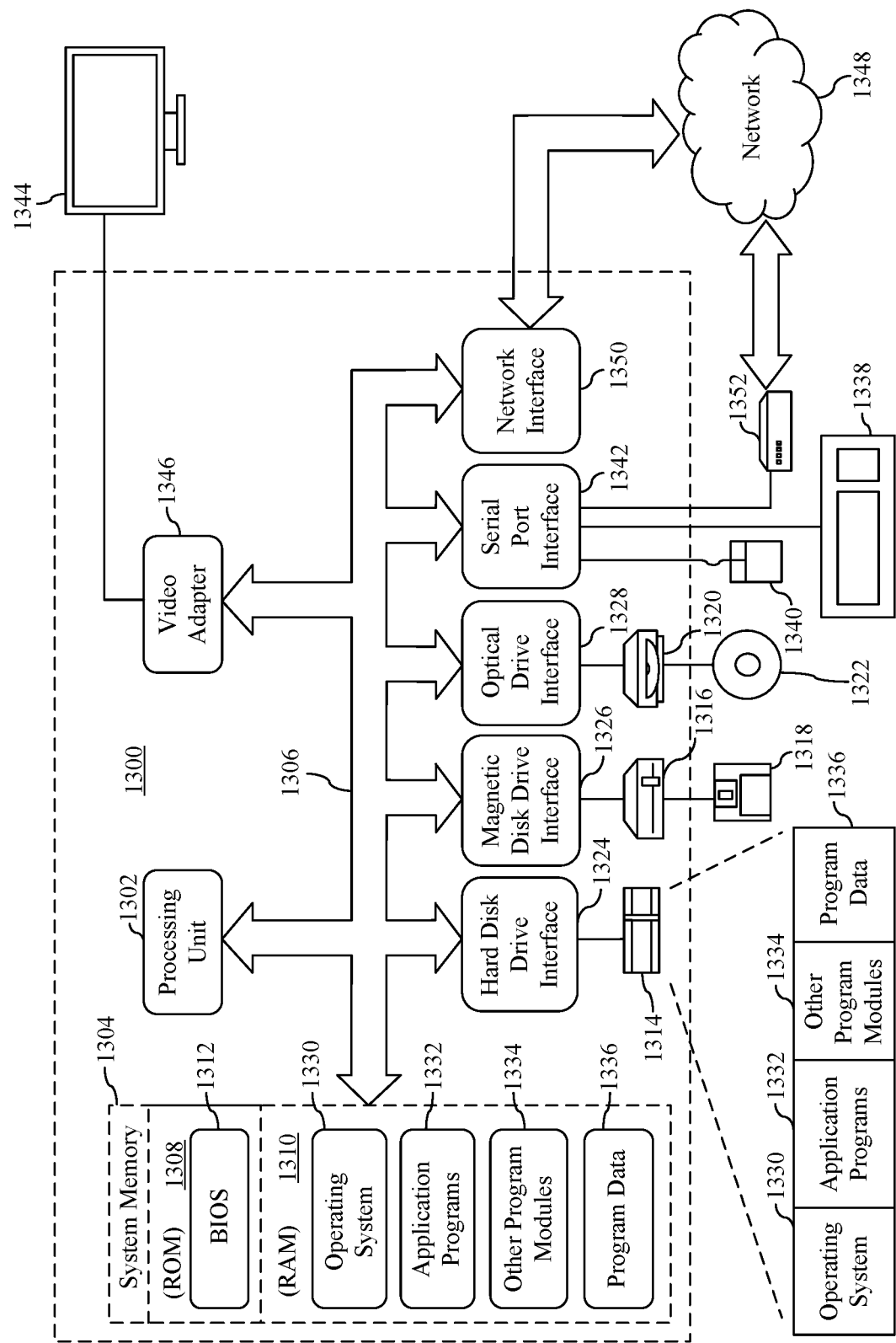
FIG. 13 shows a block diagram of an example computer system in which embodiments may be implemented.

FIG. 13 depicts an exemplary implementation of a computing device 800 in which embodiments may be implemented, including any of computing devices 102A-102N, database host 104, ledger database 106, identity map 108, ledger 206, updateable ledger table 202, history table 204, applications 308A-308B, update API 302, database verifier 304, revoke API 506, database verifier 504, application 508, lookup API 702, database verifier 704, database verifier 1000, hierarchical hash data structure 1002, root hash determiner 1004, comparator 1006, hierarchical hash data structure 1100, computing devices 1202A-1202B, identity maps 1208A-1208B, and/or applications 1208A-1208B, and/or any of the components respectively described therein, and flowcharts 400, 600, 800, and/or 900. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing the systems described above, including the embodiments described above with reference to FIGS. 1-12.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, a virtual keyboard, by providing a tap input (where a user lightly presses and quickly releases display screen 1344), by providing a "touch-and-hold" input (where a user touches and holds his finger (or touch instrument) on display screen 1344 for a predetermined period of time), by providing touch input that exceeds a predetermined pressure threshold, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to generally refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including system memory 1304 of FIG. 13). Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1352, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A system is described herein. The system includes at least one processor circuit; and at least one memory that stores program code configured to be executed by the at least one processor circuit. The program code is configured to, when executed by the at least one processor circuit, causes the system to: receive a request from a computing device on behalf of a first user to update an identity map maintained by a ledger database, the request comprising a first digest representative of a state of the ledger database and comprising a short-term public encryption key of the first user, the identity map comprising at least an identity of the first user and a long-term public signing key of the first user; validate the ledger database based at least on the first digest; responsive to validating the ledger database, associate, in the identity map, the short-term public encryption key with the long-term public signing key and the identity of the first user; generate a second digest representative of the state of the ledger database after associating the short-term public encryption key with the long-term public signing key and the identity of the first user; and provide the first user access to the second digest.

In one implementation of the foregoing system, the short-term public encryption key is signed by a long-term private signing key corresponding to the long-term public signing key.

In one implementation of the foregoing system, the program code causes the system to validate the ledger database by: generating a hierarchical hash data structure representative of rows of the ledger database; determining a root hash value for a root node of the hierarchical hash data structure; and determining that the root hash value is equal to the first digest.

In one implementation of the foregoing system, the hierarchical hash data structure is a Merkle tree.

In one implementation of the foregoing system, the program code causes the system to provide the first user access to the second digest by performing at least one of: publishing the second digest to a web page that is accessible to the computing device; or providing the second digest to the computing device.

In one implementation of the foregoing system, the short-term public encryption key is configured to encrypt communications to the computing device.

In one implementation of the foregoing system, the identity comprises at least one of: an email address of the first user; a username of the first user; or a phone number of the first user.

A method is also disclosed herein. The method includes: receiving a request from a computing device on behalf of a first user to remove at least one of a long-term public signing key or a short-term public encryption key of a second user from an identity map maintained by a ledger database, the request comprising a first digest representative of a state of the ledger database; validating the ledger database based at least on the first digest; responsive to said validating, removing, from the identity map, the at least one of the long-term public signing key or the short-term public encryption key of the second user; generating a second digest representative of the state of the ledger database after removing the at least one of the long-term public signing key or the short-term public encryption key of the second user; and providing the first user access to the second digest.

In one implementation of the foregoing method, the short-term public encryption key is signed by a long-term private signing key corresponding to the long-term public signing key.

In one implementation of the foregoing method, said validating comprises: generating a hierarchical hash data structure representative of rows of the ledger database; determining a root hash value for a root node of the hierarchical hash data structure; and determining that the root hash value is equal to the first digest.

In one implementation of the foregoing method, the hierarchical hash data structure is a Merkle tree.

In one implementation of the foregoing method, said providing comprises at least one: publishing the second digest to a web page that is accessible to the computing device; or providing the second digest to the computing device.

In one implementation of the foregoing method, the request further comprises an identity of the second user, and said removing comprises removing, from the identity map, the identity of the second user and at least one of the long-term public signing key or the short-term public encryption key of the second user.

In one implementation of the foregoing method, the identity comprises at least one of: an email address of the second user; a username of the second user; or a phone number of the second user.

A computer-readable storage medium having program instructions recorded thereon that, when executed by at least one processor, perform a method is further described herein. The method includes: receiving a request from a computing device on behalf of a first user to retrieve a short-term public encryption key of a second user from an identity map maintained by a ledger database, the request comprising a digest representative of a state of the ledger database and an identity of the second user; validating the ledger database based at least on the digest; responsive to said validating, locating the short-term public encryption key in the identity map based on the identity of the second user; and responsive to locating the short-term public encryption key, providing a response comprising the short-term public encryption key to the computing device.

In one implementation of the foregoing computer-readable storage medium, the short-term public encryption key is signed by a long-term private signing key corresponding to the long-term public signing key.

In one implementation of the foregoing computer-readable storage medium, the method further comprises: responsive to said validating, locating a long-term public signing key in the identity map based on the identity of the second user, the response further comprises the long-term public signing key.

In one implementation of the foregoing computer-readable storage medium, said validating comprises: generating a hierarchical hash data structure representative of rows of the ledger database; determining a root hash value for a root node of the hierarchical hash data structure; and determining that the root hash value is equal to the first digest.

In one implementation of the foregoing computer-readable storage medium, the short-term public encryption key is configured to encrypt communications from the computing device of the first user to a computing device of the second user.

In one implementation of the foregoing computer-readable storage medium, the identity comprises at least one of: an email address of the second user; a username of the second user; or a phone number of the second user.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   at least one processor circuit; and
   at least one memory that stores program code configured to be executed by the at least one processor circuit, the program code configured to, when executed by the at least one processor circuit, cause the system to:
   receive a request from a computing device on behalf of a first user to update an identity map maintained by a ledger database, the request comprising a first digest representative of a state of the ledger database and comprising a short-term public encryption key of the first user, the identity map comprising a plurality of identities corresponding to a plurality of users and a plurality of long-term public signing keys in association with the users, including an identity of the first user and a long-term public signing key of the first user;
   validate the ledger database based at least on the first digest;
   responsive to validating the ledger database, associate, in the identity map, the short-term public encryption key with the long-term public signing key and the identity of the first user;
   generate a second digest representative of the state of the ledger database after associating the short-term public encryption key with the long-term public signing key and the identity of the first user; and
   provide the first user access to the second digest.

2. The system of claim 1, wherein the short-term public encryption key is signed by a long-term private signing key corresponding to the long-term public signing key.

3. The system of claim 1, wherein the program code causes the system to validate the ledger database by:
   generating a hierarchical hash data structure representative of rows of the ledger database;
   determining a root hash value for a root node of the hierarchical hash data structure; and
   determining that the root hash value is equal to the first digest.

4. The system of claim 3, wherein the hierarchical hash data structure is a Merkle tree.

5. The system of claim 1, wherein the program code causes the system to provide the first user access to the second digest by performing at least one of:
   publishing the second digest to a web page that is accessible to the computing device; or
   providing the second digest to the computing device.

6. The system of claim 1, wherein the short-term public encryption key is configured to encrypt communications to the computing device.

7. The system of claim 1, wherein the identity comprises at least one of:
   an email address of the first user;
   a username of the first user; or
   a phone number of the first user.

8. A method, comprising:
   receiving a request from a computing device on behalf of a first user to remove at least one of a long-term public signing key or a short-term public encryption key of a second user from an identity map maintained by a ledger database, the request comprising a first digest representative of a state of the ledger database;
   validating the ledger database based at least on the first digest;
   responsive to said validating, removing, from the identity map, the at least one of the long-term public signing key or the short-term public encryption key of the second user;
   generating a second digest representative of the state of the ledger database after removing the at least one of the long-term public signing key or the short-term public encryption key of the second user; and
   providing the first user access to the second digest.

9. The method of claim 8, wherein the short-term public encryption key is signed by a long-term private signing key corresponding to the long-term public signing key.

10. The method of claim 8, wherein said validating comprises:
generating a hierarchical hash data structure representative of rows of the ledger database;
determining a root hash value for a root node of the hierarchical hash data structure; and
determining that the root hash value is equal to the first digest.

11. The method of claim 10, wherein the hierarchical hash data structure is a Merkle tree.

12. The method of claim 8, wherein said providing comprises at least one:
publishing the second digest to a web page that is accessible to the computing device; or
providing the second digest to the computing device.

13. The method of claim 8, wherein the request further comprises an identity of the second user, and
wherein said removing comprises removing, from the identity map, the identity of the second user and at least one of the long-term public signing key or the short-term public encryption key of the second user.

14. The method of claim 8, wherein the identity comprises at least one of:
an email address of the second user;
a username of the second user; or
a phone number of second first user.

15. A computer-readable storage medium having program instructions recorded thereon that, when executed by at least one processor, perform a method comprising:
receiving a request from a computing device on behalf of a first user to retrieve a short-term public encryption key of a second user from an identity map maintained by a ledger database, the request comprising a digest representative of a state of the ledger database and an identity of the second user;
validating the ledger database based at least on the digest;
responsive to said validating, locating the short-term public encryption key in the identity map based on the identity of the second user; and
responsive to locating the short-term public encryption key, providing a response comprising the short-term public encryption key to the computing device.

16. The computer-readable storage medium of claim 15, wherein the short-term public encryption key is signed by a long-term private signing key corresponding to the long-term public signing key.

17. The computer-readable storage medium of claim 15, the method further comprising:
responsive to said validating, locating a long-term public signing key in the identity map based on the identity of the second user,
wherein the response further comprises the long-term public signing key.

18. The computer-readable storage medium of claim 15, wherein said validating comprises:
generating a hierarchical hash data structure representative of rows of the ledger database;
determining a root hash value for a root node of the hierarchical hash data structure; and
determining that the root hash value is equal to the first digest.

19. The computer-readable storage medium of claim 15, wherein the short-term public encryption key is configured to encrypt communications from the computing device of the first user to a computing device of the second user.

20. The computer-readable storage medium of claim 15, wherein the identity comprises at least one of:
an email address of the second user;
a username of the second user; or
a phone number of the second user.

* * * * *